US 9,388,279 B2

(12) United States Patent
Cho et al.

(10) Patent No.: US 9,388,279 B2
(45) Date of Patent: *Jul. 12, 2016

(54) POLY(IMIDE-AMIDE) COPOLYMER, A METHOD OF PREPARING A POLY(IMIDE-AMIDE) COPOLYMER, AND AN ARTICLE INCLUDING A POLY(IMIDE-AMIDE) COPOLYMER

(71) Applicant: SAMSUNG ELECTRONICS CO., LTD., Suwon-si, Gyeonggi-do (KR)

(72) Inventors: Chung Kun Cho, Suwon-si (KR); Dmitry Androsov, Suwon-si (KR); Fedosya Kalinina, Hwaseong-si (KR); Mikhail Kovalev, Suwon-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 40 days.

This patent is subject to a terminal disclaimer.

(21) Appl. No.: 14/089,083

(22) Filed: Nov. 25, 2013

(65) Prior Publication Data

US 2015/0057427 A1  Feb. 26, 2015

(30) Foreign Application Priority Data

Aug. 26, 2013  (KR) .......................... 10-2013-0101127

(51) Int. Cl.
*C08G 73/14* (2006.01)
*C09D 179/08* (2006.01)

(52) U.S. Cl.
CPC .............. *C08G 73/14* (2013.01); *C09D 179/08* (2013.01)

(58) Field of Classification Search
CPC ...... C08G 73/14; C09D 179/08; C09J 179/08
See application file for complete search history.

(56) References Cited

U.S. PATENT DOCUMENTS

| | | | |
|---|---|---|---|
| 4,603,061 A | 7/1986 | St. Clair et al. | |
| 4,725,642 A | 2/1988 | Gannett et al. | |
| 5,019,642 A | 5/1991 | Hashimoto | |
| 5,756,650 A | 5/1998 | Kawamonsen et al. | |
| 5,952,908 A | 9/1999 | Kubo | |
| 6,088,760 A | 7/2000 | Walker et al. | |
| 7,416,695 B2 | 8/2008 | Kaneshiro et al. | |
| 7,579,054 B2 | 8/2009 | Akiyoshi et al. | |
| 8,053,331 B2 | 11/2011 | Gadkaree | |
| 9,018,343 B2* | 4/2015 | Park et al. ..................... | 528/342 |
| 2011/0070461 A1 | 3/2011 | Yamada et al. | |
| 2012/0296050 A1* | 11/2012 | Cho et al. ..................... | 525/436 |
| 2014/0243482 A1 | 8/2014 | Park et al. | |
| 2014/0243782 A1* | 8/2014 | Huwiler et al. ............... | 604/500 |

FOREIGN PATENT DOCUMENTS

| | | |
|---|---|---|
| JP | 02-270848 A | 11/1990 |
| JP | 03-207717 A | 9/1991 |
| JP | 1994-006563 A | 1/1994 |
| JP | 2010-180292 A | 8/2010 |

OTHER PUBLICATIONS

USPTO structure seach, May 2015.*
Buch et al., "Synthesis, characterization and thermal properties of soluble aromatic poly(amide imide)s", Polymer, vol. 46, 2005, pp. 5524-5532.
Chen et al., "Synthesis and Characterization of Polyimide/Silica Hybrid Composites", Chem. Mater. vol. 11, 1999, pp. 1218-1222.
Cheng et al., "Stress control for overlay registration in a-Si:H TFTs on flexible organic-polymer-foil substrates", Journal of the SID 13/7, 2005, pp. 563-568.
Cheng et al., "Synthesis of New Soluble Aromatic Poly(amide imide)s from Unsymmetrical Extended Diamine containing Phthalazinone Moiety", Jornal of Applied Polymer Science, vol. 92, 2004, pp. 1516-1520.
Geffroy et al., "Organic light-emitting diode (OLED) technology: materials, devices and display technologies", Polymer International, vol. 55, 2006, pp. 572-582.
Gu et al., "Vacuum-deposited, nonpolymeric flexible organic light-emitting devices", Optics Letters, vol. 22, No. 3, Feb. 1, 1997, pp. 172-174.

(Continued)

*Primary Examiner* — Gregory Listvoyb
(74) *Attorney, Agent, or Firm* — Cantor Colburn LLP

(57) ABSTRACT

A poly(imide-amide) copolymer, which is a product of a reaction between a diamine and a dianhydride, wherein the diamine comprises a diamine represented by Chemical Formula 1 and the dianhydride comprises a dianhydride represented by Chemical Formula 5:

Chemical Formula 1

$$H_2N-Ar_1-N(H)-C(O)-\underset{(R1)_{n1}}{\bigcirc}-\underset{(R2)_{n2}}{\bigcirc}-C(O)-N(H)-Ar_2-NH_2$$

Chemical Formula 5

[structure with $(R^{12})_{n7}$, $(R^{13})_{n8}$, $R^{10}$]

wherein, the variables in Chemical Formulae 1 and 5 are described in the specification.

9 Claims, 6 Drawing Sheets

(56) References Cited

OTHER PUBLICATIONS

Hasegawa et al., "Photophysics, photochemistry, and optical properties of polyimides", Prog. Polym. Sci., vol. 26, 2001, pp. 259-335.

Hedrick et al., "Polymeric Organic-Inorganic Hybrid Nanocomposites: Preparation of Polyimide-Modified Poly (silsesquioxane) Using Functionalized Poly(amic acid alkylester) Precursors", Macromolecules, vol. 30, 1997, pp. 8512-8515.

Jeong et al., "Synthesis and characterization of novel polyimides containing flourine and phosphine oxide moieties", Polymer, vol. 42, 2001, pp. 6019-6030.

Jin et al., "Flexible AMOLED displays on stainless-steel foil", Journal of the SID, 14/12, 2006, pp. 1083-1090.

Kovalev et al.,"Synthesis of transparent and thermally sable polyimide-aramid ananocomposites-Prospectie materials for high-temperature electronic manufacture applications", Polymer, 54, 2013, pp. 127-133.

Krajewska et al., "Tetralactam-modified gold electrodes for amperometric detection of acrylic acid", Supramolecular Chemistry, vol. 21, No. 6, Sep. 2009, pp. 520-531.

Lee et al., "Synthesis of colorless imide hybrid nanocomposites using amine functionalized oligosilozane nano-building clusters", Journal of Materials Chemistry, vol. 16, 2006, pp. 1657-1664.

Liaw et al., "Novel Organosoluble Poly(amide-imide)s Derived from Kink Diamine Bis[4-(4-trimellitimidophenoxy) pheny]-diphenylmethane. Synthesis and Characterization", Macromol. Chem. Phys., vol. 202, No. 9, 2001, pp. 1483-1487.

Liaw et al., "Synthesis and characterization of new highly organosoluble poly(ether imide)s derived from 1,1-bix[4-(4-dicarboxyphenoxy)phenyl]-4-tert-butylcyclohexane dianhydride", Polymer, vol. 42, 2001, pp. 7993-7998.

Liaw et al., "Synthesis and Characterization of New Highly Organosoluble Poly(ether imide)s Bearing a Noncoplanar 2,2'-Dimethyl-4,4'-biphenyl Unit and Kink Diphenylmethylene Linkage", Chem. Mater., vol. 13, 2001, pp. 1811-1816.

Lim et al., "Flexible Organic Electroluminescent Devices Based on Fluorine-containing Colorless Polyimide Substrates", Advanced Materials, vol. 14, No. 18, Sep. 16, 2002, pp. 1275-1279.

Liou et al., "Synthesis and Evaluation of Photoluminescent and Electrochemical Propoerties of New Aromatic Polyamides and Polyimides with a kink 1, 2-Phenylenediamine Moiety", Journal of Polymer Science: Part A: Polymer Chemistry, vol. 44, 2006, pp. 2587-2603.

Long et al.,"P-24: High-Temperature (250 C) Amorphous-Silicon TFT's on Clear Plastic Substrates", SID 05 Digest, 2005, pp. 313-315.

Morikawa et al., "Preparation of New Polyimide-Silica Hybrid Materials via the Sol-Gel Process", J. Mater. Chem., vol. 2(7), 1992, pp. 679-690.

Myung et al., "Synthesis and characterization of polyimides from novel 1-(3',5'-bis(trifluoromethyl)benzene) pyromelliticdianhydride (6FPPMDA)", Polymer, vol. 45, 2004, pp. 3185-3193.

Stewart et al., "Polysilicon TFT Technology for Active Matrix OLED Displays", IEEE Transactions on Electron Devices, vol. 48, No. 5, May 2001, pp. 845-851.

Tang et al., "Organic Electroluminescent Diodes", Physics, vol. 38, pp. 356-357.

Kane et al., "34.4: High Performance CMOS-on-Plastic Circuits using Sequential Laterally Solidified Silicon TFTs", SID Digest, 2006, pp. 1365-1367.

Crawford GP, Flexible Flat Panel Displays, New York: Wiley: 2005, 1.1-3.7.4.

Mittal KL, Polyimides and other high temperature polymers: synthesis, characterization, vol. 2, 3.4.3, Optical Properties, Utrecht: VSP: 2003.

Mittal KL, Polyimides and other high temperature polymers synthesis, characterization, vol. 2, 3.7, Optical Properties, Utrecht: VSP: 2003.

* cited by examiner

POLY(IMIDE-AMIDE) COPOLYMER, A METHOD OF PREPARING A POLY(IMIDE-AMIDE) COPOLYMER, AND AN ARTICLE INCLUDING A POLY(IMIDE-AMIDE) COPOLYMER

CROSS-REFERENCE TO RELATED APPLICATION

This application claims priority to and the benefit of Korean Patent Application No. 10-2013-0101127, filed on Aug. 26, 2013, and all the benefits accruing therefrom under 35 U.S.C. §119, the content of which is incorporated herein in its entirety by reference.

BACKGROUND

1. Field

This disclosure relates to a poly(imide-amide) copolymer, a method of preparing a poly(imide-amide) copolymer, and to an article including a poly(imide-amide) copolymer.

2. Description of the Related Art

A colorless transparent material has been researched for diverse purposes such as for an optical lens, a functional optical film, and a disk substrate. But as information devices are being further miniaturized and display devices are providing higher resolution, more functions and greater performance are required from the material.

Therefore, there remains a need in a colorless transparent material having excellent transparency, heat resistance, mechanical strength, and flexibility.

SUMMARY

An embodiment provides a poly(imide-amide) copolymer having improved optical and thermal properties.

Another embodiment provides a method of preparing a poly(imide-amide) copolymer.

Yet another embodiment provides an article including a poly(imide-amide) copolymer.

According to an embodiment, provided is a diamine represented by following Chemical Formula 1:

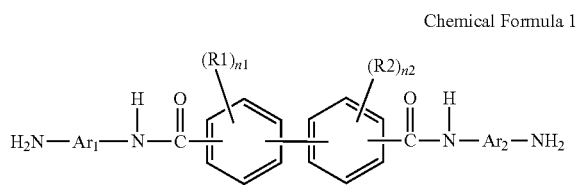

Chemical Formula 1 wherein, in Chemical Formula 1,

R1 and R2 are the same or different, and are each independently selected from a halogen, a hydroxyl group, a substituted or unsubstituted C1 to C10 alkyl group, a substituted or unsubstituted C6 to C20 aryl group, or a substituted or unsubstituted C1 to C10 alkoxy group, n1 and n2 are the same or different and are each independently an integer from 0 to 4, $Ar_1$ and $Ar_2$ are the same or different and are each independently represented by Chemical Formula 2, Chemical Formula 3, or Chemical Formula 4:

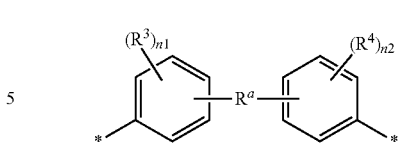

Chemical Formula 2 wherein, in Chemical Formula 2, $R^a$ is a substituted or unsubstituted C3 to C30 alicyclic organic group, a substituted or unsubstituted C6 to C30 aromatic organic group, or a substituted or unsubstituted C2 to C30 heterocyclic group, $R^3$ and $R^4$ are the same or different and are each independently a halogen, a hydroxyl group, a substituted or unsubstituted C1 to C10 aliphatic group, a substituted or unsubstituted C6 to C20 aromatic group, an alkoxy group of formula $—OR^{200}$, wherein $R^{200}$ is a C1 to C10 aliphatic organic group, or a silyl group of formula $—SiR^{201}R^{202}R^{203}$ wherein $R^{201}$, $R^{202}$, and $R^{203}$ are the same or different and are each independently a hydrogen or a C1 to C10 aliphatic organic group, and n1 and n2 are the same or different and are each independently an integer ranging from 0 to 4.

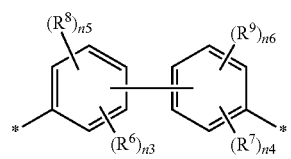

Chemical Formula 3 wherein, in Chemical Formula 3, $R^6$ and $R^7$ are the same or different and are each independently an electron withdrawing group, $R^8$ and $R^9$ are the same or different, and are each independently a halogen, a hydroxy group, a substituted or unsubstituted C1 to C10 aliphatic organic group, a substituted or unsubstituted C6 to C20 aromatic organic group, an alkoxy group of formula $—OR^{204}$, wherein $R^{204}$ is a C1 to C10 aliphatic organic group, or a silyl group of formula $—SiR^{205}R^{206}R^{207}$, wherein $R^{205}$, $R^{206}$, and $R^{207}$ are the same or different, and are each independently a hydrogen or a C1 to C10 aliphatic organic group, n3 is an integer ranging from 1 to 4,
n5 is an integer ranging from 0 to 3,
n3+n5 is an integer ranging from 1 to 4,
n4 is an integer ranging from 1 to 4,
n6 is an integer ranging from 0 to 3,
n4+n6 is an integer ranging from 1 to 4.

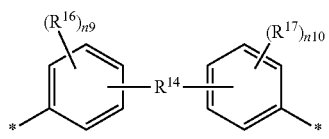

Chemical Formula 4

In Chemical Formula 4, $R^{14}$ is $—O—$, $—S—$, $—C(=O)—$, $—CH(OH)—$, $—S(=O)_2—$, $—Si(CH_3)_2—$, $—(CH_2)_p—$, wherein $1 \leq p \leq 10$, $—(CF_2)_q—$, wherein $1 \leq q \leq 10$, $—C(CH_3)_2—$, $—C(CF_3)_2—$, and $—C(=O)NH—$, or a substituted or unsubstituted C6 to C30 aromatic organic group, wherein the aromatic organic group is one aromatic ring, two or more aromatic rings fused together to provide a condensed ring system, or two or more moieties linked through a single bond or through a functional group selected from a fluorenylene group, —O—, —S—, —C(=O)—, —CH(OH)—, —S(=O)$_2$—, —Si(CH$_3$)$_2$—, —(CH$_2$)$_p$— wherein 1≤p≤10, —(CF$_2$)$_q$— wherein 1≤q≤10, —C(CH$_3$)$_2$—, —C(CF$_3$)$_2$—, and —C(=O)NH—, $R^{16}$ and $R^{17}$ are the same or different, and are each independently a halogen, a hydroxy group, a substituted or unsubstituted C1 to C10 aliphatic organic group, a substituted or unsubstituted C6 to C20 aromatic organic group, an alkoxy group of formula —OR$^{212}$, wherein $R^{212}$ is a C1 to C10 aliphatic organic group, or a silyl group of formula —SiR$^{213}$R$^{214}$R$^{215}$, wherein $R^{213}$, $R^{214}$, and $R^{215}$ are the same or different, and are each independently a hydrogen or a C1 to C10 aliphatic organic group, and n9 and n10 are each independently an integer ranging from 0 to 4.

In Chemical Formula 2, $R^a$ may be selected from chemical formulae.

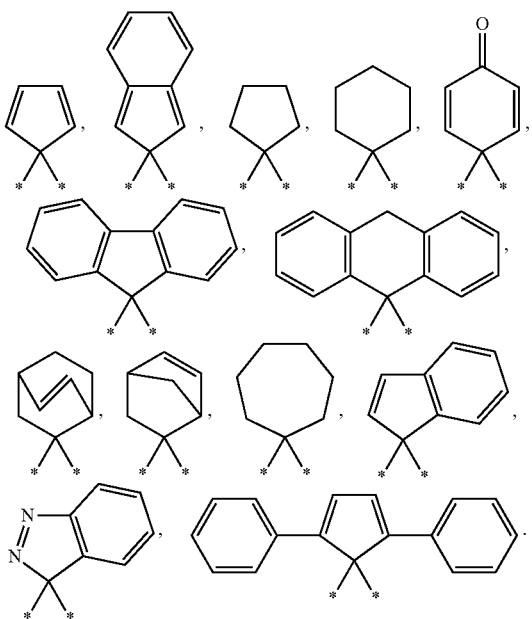

In Chemical Formula 3, the $R^6$ and $R^7$ may be the same or different, and may be independently selected from —CF$_3$, —CCl$_3$, —CBr$_3$, —Cl$_3$, —NO$_2$, —CN, —C(=O)CH$_3$, and —CO$_2$C$_2$H$_5$.

In Chemical Formula 4, the $R^{14}$ may be SO$_2$, and both of $n_9$ and $n_{10}$ may be the integer of 0.

According to another embodiment, provided is a poly (imide-amide) copolymer reaction product of a diamine represented by Chemical Formula 1 and a dianhydride represented by Chemical Formula 5:

Chemical Formula 5

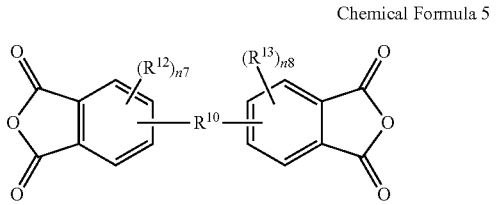

wherein, in Chemical Formula 5, $R^{10}$ is a substituted or unsubstituted C1 to C30 aliphatic group, a substituted or unsubstituted C3 to C30 alicyclic organic group, a substituted or unsubstituted C6 to C30 aromatic organic group, or a substituted or unsubstituted C2 to C30 heterocyclic group, $R^{12}$ and $R^{13}$ are the same or different and are each independently a halogen, a hydroxyl group, a substituted or unsubstituted C1 to C10 aliphatic group, a substituted or unsubstituted C6 to C20 aromatic group, an alkoxy group of formula —OR$^{205}$, wherein $R^{205}$ is a C1 to C10 aliphatic organic group, or a silyl group of formula —SiR$^{209}$R$^{210}$R$^{211}$, wherein $R^{209}$, $R^{210}$, and $R^{211}$ are the same or different and are each independently a hydrogen or a C1 to C10 aliphatic organic group, and n7 and n8 are the same or different and are each independently an integer ranging from 0 to 3.

The diamine may further include another diamine, in addition to the diamine represented by Chemical Formula 1, reacting with the anhydride represented by Chemical Formula 5 to produce the poly(imide-amide) copolymer.

The poly(imide-amide) copolymer may have an amino group at both ends thereof.

The poly(imide-amide) copolymer may have an anhydride group at both ends thereof.

The poly(imide-amide) copolymer may have an amino group at one end thereof, and may have an anhydride group at the other end thereof.

The dianhydride represented by Chemical Formula 5 may be represented by Chemical Formula 6, Chemical Formula 7, or a combination thereof:

Chemical Formula 6

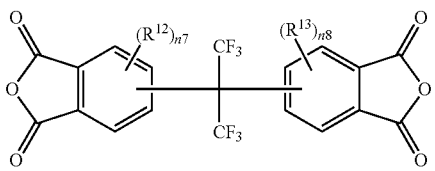

Chemical Formula 7

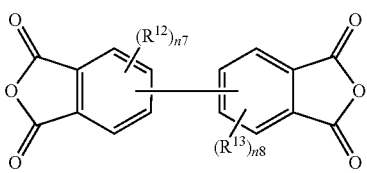

wherein, in Chemical Formulae 6 and 7, $R^{12}$ and $R^{13}$ are the same or different, and are independently a halogen, a hydroxy group, a substituted or unsubstituted C1 to C10 aliphatic organic group, a C6 to C20 aromatic organic group, an alkoxy group of formula —OR$^{208}$, wherein $R^{208}$ is a C1 to C10 aliphatic organic group, or a silyl group of formula —SiR$^{209}$R$^{210}$R$^{211}$, wherein $R^{209}$, $R^{210}$, and $R^{211}$ are the same or different, and are each independently hydrogen or a C1 to C10 aliphatic organic group, and n7 and n8 are each independently integers ranging from 0 to 3.

The additional diamine may be represented by Chemical Formula 2-1, Chemical Formula 3-1, Chemical Formula 4-1, or a combination thereof:

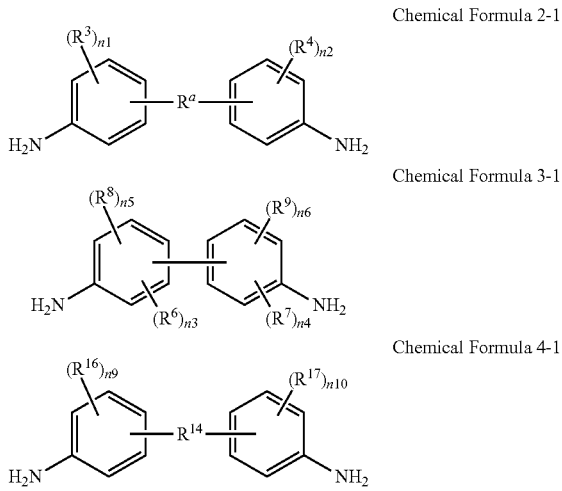

Chemical Formula 2-1

Chemical Formula 3-1

Chemical Formula 4-1

In Chemical Formula 2-1, the definitions of $R^a$, $R^3$, $R^4$, and $n_1$ and $n_2$ are the same as those defined in Chemical Formula 2.

In Chemical Formula 3-1, the definitions of $R^6$ to $R^9$, and $n_3$ to $n_6$ are the same as those defined in Chemical Formula 3.

In Chemical Formula 4-1, the definitions of $R^{14}$, $R^{16}$, and $R^{17}$, and $n_9$ and $n_{10}$ are the same as those defined in Chemical Formula 4.

The poly(imide-amide) copolymer may be represented by Chemical Formula 8:

Chemical Formula 8

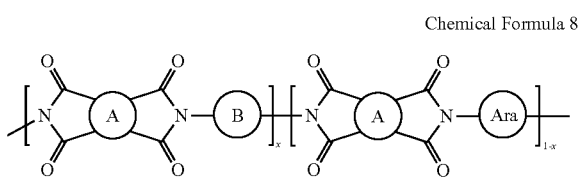

In Chemical Formula 8,

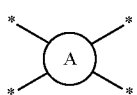

may be represented by Chemical Formula 5-1.

Chemical Formula 5-1

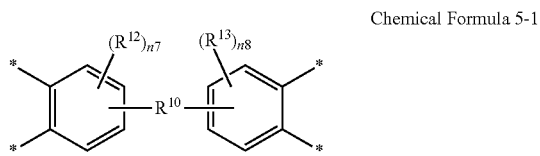

In Chemical Formula 5-1, the definitions of $R^{10}$, $R^{12}$, $R^{13}$, and n7 and n8 are the same as those defined in Chemical Formula 5.

Chemical Formula 5-1 may be represented by Chemical Formula 6-1, or Chemical Formula 7-1.

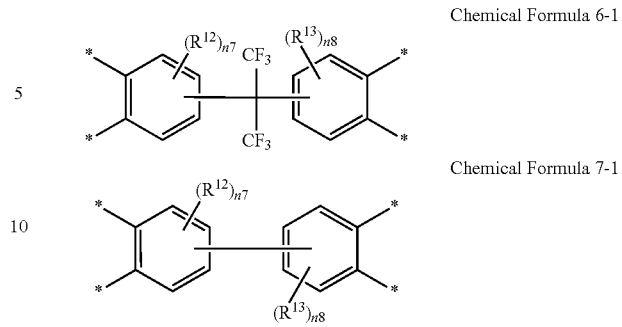

Chemical Formula 6-1

Chemical Formula 7-1

In Chemical Formulae 6-1 and 7-1, the definitions of $R^{12}$, $R^{13}$, and $n_7$ and $n_8$ are the same as those defined in Chemical Formula 6 and Chemical Formula 7, respectively.

In Chemical Formula 8,

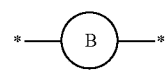

may derive from Chemical Formula 1, which corresponds to the structure, wherein the amino groups at both ends of Chemical Formula 1 are deleted, and may be represented by Chemical Formula 9:

Chemical Formula 9

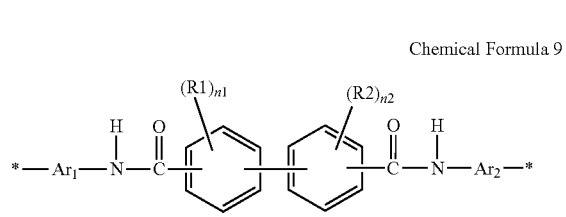

In Chemical Formula 9, the definitions of $R^1$, $R^2$, $Ar_1$, $Ar_2$, and $n_1$ and $n_2$ are the same as those in Chemical Formula 1, respectively.

In Chemical Formula 8, x indicates the mole fraction of the unit represented by x based on 1 mole of the copolymer represented by Chemical Formula 8, i.e., $0 \leq x < 1$.

According to another embodiment, provided is a method of preparing a poly(imide-amide) copolymer including reacting a diamine including a diamine represented by Chemical Formula 1 with an anhydride represented by Chemical Formula 5 to separately prepare a poly(imide-amide) oligomer having an amino group at both ends thereof and a poly(imide-amide) oligomer having an anhydride group at both ends thereof, mixing the separately prepared two types of oligomers to provide a mixture, and curing the mixture.

In the method, the poly(imide-amide) oligomer having an amino group at both ends thereof and the poly(imide-amide) oligomer having an anhydride group at both ends thereof may be mixed in a mole ratio of about 1:1.

Each of the poly(imide-amide) oligomer having an amino group at both ends thereof and the poly(imide-amide) oligomer having an anhydride group at both ends thereof may have a weight average molecular weight of about 10,000 gram/mole ("g/mol") to about 20,000 g/mol. In an example embodiment, the poly(imide-amide) oligomer having an anhydride group at both ends thereof may have a larger weight average molecular weight than the poly(imide-amide) oligomer having an amino group at both ends thereof.

The method may further include conducting an imidization reaction of the poly(imide-amide) oligomer having an anhydride group at both ends thereof prior to the mixing the poly(imide-amide) oligomer having an anhydride group at both ends thereof with the poly(imide-amide) oligomer having an amino group at both ends thereof to provide a mixture.

The imidization may be a chemical imidization, and the poly(imide-amide) oligomer having an anhydride group at both ends thereof may be partially or fully imidized.

According to yet another embodiment, provided is an article including the poly(imide-amide) copolymer prepared by using the method.

Particularly, the article may be a film, a fiber, a coating material, or an adhesive.

The article may have a total light transmittance of greater than or equal to about 80%, for example greater than or equal to about 85%, in a wavelength range of 380 nanometers to 750 nanometers, and the article may have light transmittance of greater than or equal to about 81% in a wavelength of a 430 nanometers.

The article may have a coefficient of thermal expansion ("CTE") of less than or equal to about 25 parts per million per degree Centigrade ("ppm/° C."), for example, of less than or equal to about 23 ppm/° C., for example, of less than or equal to about 20 ppm/° C.

The article may have a yellowness index ("YI") of less than or equal to about 5%.

The article may have a glass transition temperature ("Tg") of greater than or equal to about 300° C., for example, of greater than or equal to about 320° C.

According to still another embodiment, provided is a display device including the article.

The display device may be an organic light emitting diode ("OLED").

Hereinafter, further embodiments will be described in detail.

BRIEF DESCRIPTION OF THE DRAWINGS

The above and other aspects, advantages and features of this disclosure will become more apparent by describing in further detail exemplary embodiments thereof with reference to the accompanying drawings, in which:

FIG. 5B is enlarged view of a part of FIG. 5A.

DETAILED DESCRIPTION

Figure 1:
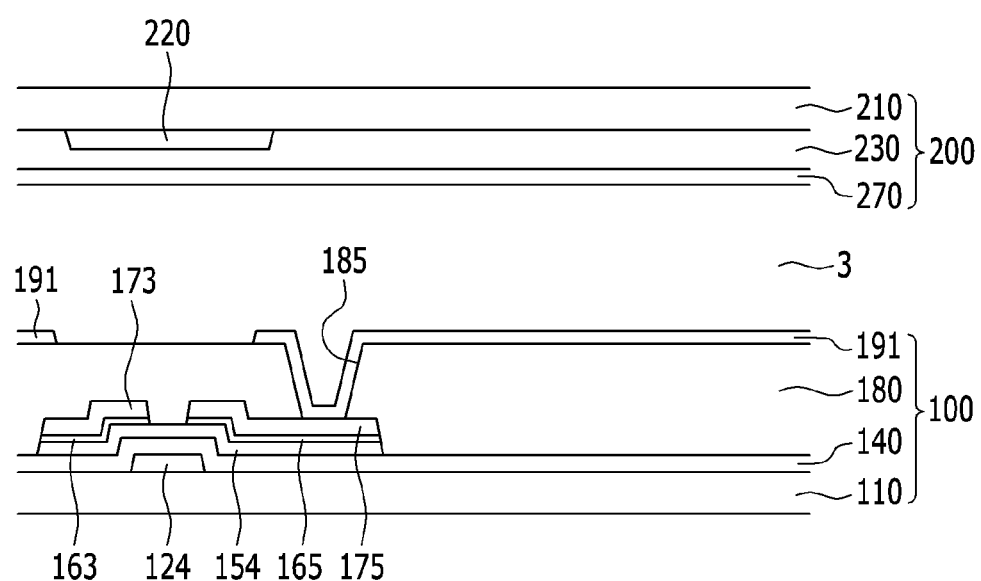
FIG. 1 is a cross-sectional view of a liquid crystal display ("LCD") in accordance with an embodiment.

This disclosure will be described more fully hereinafter with reference to the accompanying drawings, in which embodiments are shown. This disclosure may, however, be embodied in many different forms and is not to be construed as limited to the exemplary embodiments set forth herein.

It will be understood that when an element is referred to as being "on" another element, it may be directly on the other element or intervening elements may be present therebetween. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an" and "the" are intended to include the plural forms as well, unless the context clearly indicates otherwise. The term "or" means "and/or." As used herein, the term "and/or" includes any and all combinations of one or more of the associated listed items. Expressions such as "at least one of," when preceding a list of elements, modify the entire list of elements and do not modify the individual elements of the list.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Mixture" as used herein is inclusive of all types of combinations, including blends, alloys, solutions, and the like.

As used herein, when a specific definition is not otherwise provided, the term "substituted" refers to a group or compound substituted with at least one substituent including a halogen (—F, —Br, —Cl, or —I), a hydroxyl group, a nitro group, a cyano group, an amino group (—NH$_2$, —NH(R$^{100}$) or —N(R$^{101}$)(R$^{102}$), wherein R$^{100}$, R$^{101}$, and R$^{102}$ are the same or different, and are each independently a C1 to C10 alkyl group, an amidino group, a hydrazine group, a hydrazone group, a carboxyl group, an ester group, a ketone group, a substituted or unsubstituted alkyl group, a substituted or unsubstituted alicyclic organic group, a substituted or unsubstituted aryl group, a substituted or unsubstituted alkenyl group, a substituted or unsubstituted alkynyl group, a substituted or unsubstituted heteroaryl group, and a substituted or unsubstituted heterocyclic group, in place of at least one hydrogen of a functional group, or the substituents may be linked to each other to provide a ring.

As used herein, the term "alkyl group" refers to a straight or branched chain saturated aliphatic hydrocarbon having the specified number of carbon atoms and having a valence of at least one. Non-limiting examples of the alkyl group are methyl, ethyl, and propyl.

As used herein, the term "alkoxy group" refers to "alkyl-O—", wherein the term "alkyl" has the same meaning as described above. Non-limiting examples of the alkoxy group are methoxy, ethoxy, propoxy, cyclopropoxy, and cyclohexyloxy.

As used herein, the term "aryl group", which is used alone or in combination, refers to an aromatic hydrocarbon containing at least one ring. Non-limiting examples of the aryl group are phenyl, naphthyl, and tetrahydronaphthyl.

As used herein, when a specific definition is not otherwise provided, the term "alkyl group" refers to a C1 to C30 alkyl group, and specifically a C1 to C15 alkyl group, the term "cycloalkyl group" refers to a C3 to C30 cycloalkyl group, and specifically a C3 to C18 cycloalkyl group, the term "alkoxy group" refer to a C1 to C30 alkoxy group, and specifically a C1 to C18 alkoxy group, the term "ester group" refers to a C2 to C30 ester group, and specifically a C2 to C18 ester group, the term "ketone group" refers to a C2 to C30 ketone group, and specifically a C2 to C18 ketone group, the term "aryl group" refers to a C6 to C30 aryl group, and specifically a C6 to C18 aryl group, the term "alkenyl group" refers to a C2 to C30 alkenyl group, and specifically a C2 to C18 alkenyl group, the term "alkynyl group" refers to a C2 to C30 alkynyl group, and specifically a C2 to C18 alkynyl group, the term "alkylene group" refers to a C1 to C30 alkylene group, and specifically a C1 to C18 alkylene group, and the term "arylene group" refers to a C6 to C30 arylene group, and specifically a C6 to C16 arylene group.

As used herein, when a specific definition is not otherwise provided, the term "aliphatic" refers to a C1 to C30 alkyl group, a C2 to C30 alkenyl group, a C2 to C30 alkynyl group, a C1 to C30 alkylene group, a C2 to C30 alkenylene group, or a C2 to C30 alkynylene group, specifically a C1 to C15 alkyl group, a C2 to C15 alkenyl group, a C2 to C15 alkynyl group, a C1 to C15 alkylene group, a C2 to C15 alkenylene group, or a C2 to C15 alkynylene group, the term "alicyclic organic group" refers to a C3 to C30 cycloalkyl group, a C3 to C30 cycloalkenyl group, a C3 to C30 cycloalkynyl group, a C3 to C30 cycloalkylene group, a C3 to C30 cycloalkenylene group, or a C3 to C30 cycloalkynylene group, specifically a C3 to C15 cycloalkyl group, a C3 to C15 cycloalkenyl group, a C3 to C15 cycloalkynyl group, a C3 to C15 cycloalkylene group, a C3 to C15 cycloalkenylene group, or a C3 to C15 cycloalkynylene group.

As used herein when a definition is not otherwise provided, the term "aromatic organic group" refers to a C6 to C30 group comprising one aromatic ring, two or more aromatic rings fused together to provide a condensed ring system, or two or more moieties independently selected from the foregoing (a single aromatic ring or a condensed ring system) linked through a single bond or through a functional group selected from a fluorenylene group, —O—, —S—, —C(=O)—, —CH(OH)—, —S(=O)$_2$—, —Si(CH$_3$)$_2$—, —(CH$_2$)$_p$—, wherein 1≤p≤10, —(CF$_2$)$_q$—, wherein 1≤q≤10, —C(CH$_3$)$_2$—, —C(CF$_3$)$_2$—, and —C(=O)NH—, and specifically through —S(=O)$_2$—, for example an aryl group or a C6 to C30 arylene group, specifically a C6 to C16 aryl group or a C6 to C16 arylene group such as phenylene. An example of an aromatic organic group is a fluorenylene group.

As used herein, when a specific definition is not otherwise provided, the term "heterocyclic group" refers to a C2 to C30 cycloalkyl group, a C2 to C30 cycloalkylene group, a C2 to C30 cycloalkenyl group, a C2 to C30 cycloalkenylene group, a C2 to C30 cycloalkynyl group, a C2 to C30 cycloalkynylene group, a C2 to C30 heteroaryl group, or a C2 to C30 heteroarylene group including 1 to 3 heteroatoms selected from O, S, N, P, Si, and a combination thereof in one ring, specifically a C2 to C15 cycloalkyl group, a C2 to C15 cycloalkylene group, a C2 to C15 cycloalkenyl group, a C2 to C15 cycloalkenylene group, a C2 to C15 cycloalkynyl group, a C2 to C15 cycloalkynylene group, a C2 to C15 heteroaryl group, or a C2 to C15 heteroarylene group including 1 to 3 heteroatoms selected from O, S, N, P, Si, and a combination thereof, in one ring.

As used herein, when a definition is not otherwise provided, "combination" commonly refers to mixing or copolymerization.

In addition, in the specification, the mark "*" may refer to a point of attachment to another atom.

Poly(imide-aramide) copolymer has excellent thermal, mechanical, and optical properties, and thus is useful in preparing a plastic substrate for OLED or LCD. There is a problem, however, in preparing poly(imide-aramide) copolymer, which involves HCl produced as a by-product during the process of preparing aramide, as described in the following Reaction Formula 1.

Reaction Formula 1

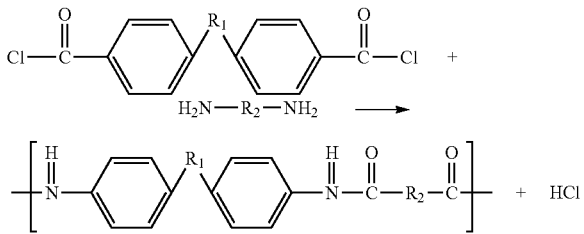

The HCl causes corrosion of an element of an apparatus, and thus should be necessarily removed by precipitation.

Poly(imide-aramide) copolymer, however, may reduce its molecular weight during the precipitation process due to breakage of amic acids with water. Further, imidization is partially processed during the process of removing water, and thus the resulting copolymer may not dissolve or may be reduced in its solubility in a solvent, such as DMAc or NMP, etc. The reduction in molecular weight of the copolymer due to the breakage of amic acids may also cause whiteness of a film prepared from the copolymer.

Meanwhile, an oligomer having a low molecular weight is used in preparing a substrate for OLED, since low viscosity is required for coating. In this case, a property of a film may be affected by the group attached to the terminal end of the oligomer. Polyimide may be prepared by reacting monomers of a dianhydride and a diamine, in which an excess of a dianhydride or a diamine is used for preparing an oligomer having a low molecular weight. In this case, however, if an excess of dianhydride is used, the dianhydride may react with water to form a carboxylic acid, which makes it difficult to form a polymer as the carboxylic acid may react with an amine. When an excess of amine is used, the amine may be oxidized during the process of precipitation and drying.

If an amine containing an amide is used, precipitation process may be omitted, which makes it possible to prevent the property of a poly(imide-amide) film from being deteriorated.

Meanwhile, a substrate for OLED should be maintained colorless and transparent, and should not outgas at a high temperature of 400° C. or more. An oligomer including a terminal end having an amine may be oxidized to change color at a high temperature, while an oligomer including a terminal end having an anhydride may react with water contained in air to form a carboxylic acid, which may produce $CO_2$ by a dicarboxylation reaction at a temperature of 350° C. or more to cause outgassing problem. Further, the coefficient of thermal expansion ("CTE") of a poly(imide-aramide) copolymer may become high, if the molecular weight of the copolymer is low.

According to an embodiment, in order to solve the above problems, provided is a diamine monomer including an aramid structure therein and amino groups at both ends thereof. The diamine may be represented by following Chemical Formula 1:

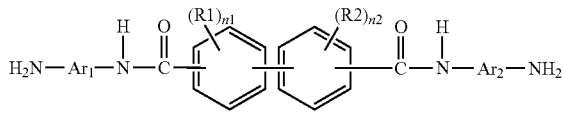

Chemical Formula 1

In Chemical Formula 1,

R1 and R2 are the same or different, and are each independently selected from a halogen, a hydroxyl group, a substituted or unsubstituted C1 to C10 alkyl group, a substituted or unsubstituted C6 to C20 aryl group, or a substituted or unsubstituted C1 to C10 alkoxy group, n1 and n2 are the same or different, and are each independently an integer from 0 to 4, $Ar_1$ and $Ar_2$ are the same or different and are each independently represented by following Chemical Formula 2, Chemical Formula 3, or Chemical Formula 4:

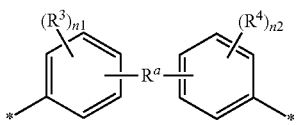

Chemical Formula 2

In Chemical Formula 2, $R^a$ is a substituted or unsubstituted C3 to C30 alicyclic organic group, a substituted or unsubstituted C6 to C30 aromatic organic group, or a substituted or unsubstituted C2 to C30 heterocyclic group, $R^3$ and $R^4$ are the same or different and are each independently a halogen, a hydroxyl group, a substituted or unsubstituted C1 to C10 aliphatic group, a substituted or unsubstituted C6 to C20 aromatic group, an alkoxy group of formula —$OR^{200}$, wherein $R^{200}$ is a C1 to C10 aliphatic organic group, or a silyl group of formula —$SiR^{201}R^{202}R^{203}$, wherein $R^{201}$, $R^{202}$, and $R^{203}$ are the same or different and are each independently a hydrogen or a C1 to C10 aliphatic organic group, and n1 and n2 are the same or different and are each independently an integer ranging from 0 to 4.

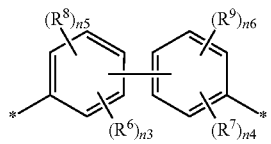

Chemical Formula 3

In Chemical Formula 3, $R^6$ and $R^7$ are the same or different and are each independently an electron withdrawing group, $R^8$ and $R^9$ are the same or different, and are each independently a halogen, a hydroxy group, a substituted or unsubstituted C1 to C10 aliphatic organic group, a substituted or unsubstituted C6 to C20 aromatic organic group, an alkoxy group of formula —$OR^{204}$, wherein $R^{204}$ is a C1 to C10 aliphatic organic group, or a silyl group of formula —$SiR^{205}R^{206}R^{207}$, wherein $R^{205}$, $R^{206}$, and $R^{207}$ are the same or different, and are each independently a hydrogen, a C1 to C10 aliphatic organic group, n3 is an integer ranging from 1 to 4, n5 is an integer ranging from 0 to 3, provided that n3+n5 is an integer ranging from 1 to 4, n4 is an integer ranging from 1 to 4, n6 is an integer ranging from 0 to 3, provided that n4+n6 is an integer ranging from 1 to 4.

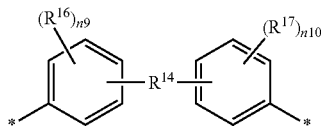

Chemical Formula 4

In Chemical Formula 4, $R^{14}$ is —O—, —S—, —C(=O)—, —CH(OH)—, —S(=O)$_2$—, —Si(CH$_3$)$_2$—, —(CH$_2$)$_p$—, wherein $1 \leq p \leq 10$, —(CF$_2$)$_q$—, wherein $1 \leq q \leq 10$, —C(CH$_3$)$_2$—, —C(CF$_3$)$_2$—, and —C(=O)NH—, or a substituted or unsubstituted C6 to C30 aromatic organic group, wherein the aromatic organic group is one aromatic ring, two or more aromatic rings fused together to provide a condensed ring system, or two or more moieties linked through a single bond or through a functional group selected from a fluorenylene group, —O—, —S—, —C(=O)—, —CH(OH)—, —S(=O)$_2$—, —Si(CH$_3$)$_2$—, —(CH$_2$)$_p$—, wherein $1 \leq p \leq 10$, —(CF$_2$)$_q$—, wherein $1 \leq q \leq 10$, —C(CH$_3$)$_2$—, —C(CF$_3$)$_2$—, and —C(=O)NH—, $R^{16}$ and $R^{17}$ are the same or different, and are each independently a halogen, a hydroxy group, a substituted or unsubstituted C1 to C10 aliphatic organic group, a substituted or unsubstituted C6 to C20 aromatic organic group, an alkoxy group of formula —$OR^{212}$, wherein $R^{212}$ is a C1 to C10 aliphatic organic group, or a silyl group of formula —SiR²¹³R²¹⁴R²¹⁵, wherein R²¹³, R²¹⁴, and R²¹⁵ are the same or different, and are each independently a hydrogen or a C1 to C10 aliphatic organic group, and n9 and n10 are each independently an integer ranging from 0 to 4.

As represented by above Chemical Formula 1, the diamine includes an aramid structure between two terminal amino groups, and thus when reacted with a dianhydride to prepare an 'imide', an '(imide-aramide)' copolymer is prepared, as well as preparing an 'imide', because the aramide structure is included in the diamine. Accordingly, a separate reaction to provide an 'amide' is not necessary, and thus the precipitation process for removing HCl, which is a by-product in preparing "poly(imide-amide) copolymer" according to the conventional method, can be omitted.

The diamine represented by above Chemical Formula 1 may be prepared by a process of preparing an amide according to the methods known in the art. For example, such as a low-temperature solution polymerization method, an interface polymerization method, a melt polymerization method, and a solid-phase polymerization method, but is not limited thereto.

For example, the diamine may be prepared by reacting a carboxylic acid dichloride with a diamine in an aprotic polar solvent according to the low-temperature solution polymerization.

The aprotic polar solvent may include a sulfoxide-containing solvent such as dimethylsulfoxide and diethylsulfoxide, a formamide-containing solvent such as N,N-dimethylformamide and N,N-diethylformamide, an acetamide-containing solvent such as N,N-dimethylacetamide, N,N-dimethylmethoxyacetamide, and N,N-diethylacetamide, a pyrrolidone-containing solvent such as N-methyl-2-pyrrolidone, N-acetyl-2-pyrrolidone, and N-vinyl-2-pyrrolidone, a phenol-containing solvent such as phenol, o-, m-, or p-cresol, xylenol, a halogenated phenol, catechol, hexamethylphosphoramide, γ-butyrolactone, or a mixture thereof. However, this disclosure is not limited to an aprotic polar solvent, and an aromatic hydrocarbon solvent such as xylene and toluene may be used. Also, to promote the dissolution of the polymer, an alkali metal salt or an alkaline earth metal salt may be further added to the solvent in an amount of less than or equal to about 50 percent by weight (wt %) based on the total amount of the solvent.

Particularly, in Synthesis Example 1, as an example of the above diamine, DA-119, is prepared by reacting 2,2'-bis(trifluoromethyl)benzidine ("TFDB") with biphenyl dicarbonyl chloride ("BPCl"). Then, in the following examples, the resulting diamine, DA119, is reacted with a dianhydride and an additional diamine to prepare a poly(imide-amide) copolymer, in which the by-product, HCl, is not produced.

Particularly, in Chemical Formula 2, $R^\alpha$ may be selected from the following chemical formulae.

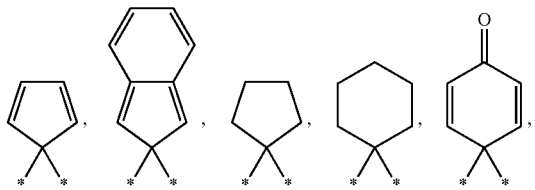

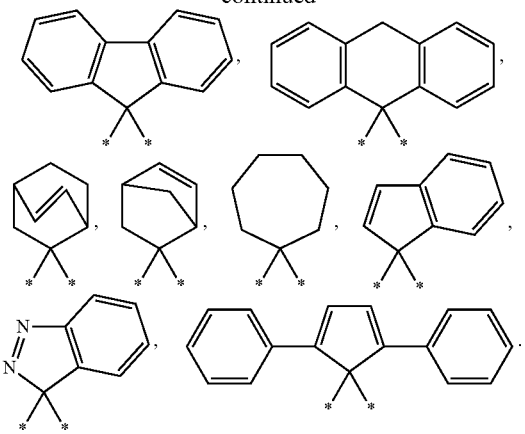

Particularly, in Chemical Formula 3, the $R^6$ and $R^7$ may be the same or different, and may be independently selected from —$CF_3$, —$CCl_3$, —$CBr_3$, —$Cl_3$, —$NO_2$, —$CN$, —$C(O=)CH_3$, and —$CO_2C_2H_5$.

Particularly, in Chemical Formula 4, the $R^{14}$ may be $SO_2$, and both of $n_9$ and $n_{10}$ may be the integer of 0.

In the diamine prepared in Example 1, both n1 and n2 in above Chemical Formula 1 are 0, both $Ar_1$ and $Ar_3$ are the same and are represented by above Chemical Formula 3, both $R^6$ and $R^7$ in the Chemical Formula 3 are —$CF_3$, both the n3 and n4 are 1, and both n5 and n6 are 0.

According to another embodiment, provided is a poly(imide-amide) copolymer prepared by reacting a diamine including a diamine represented by above Chemical Formula 1 with a dianhydride.

The method of preparing an imide or a precursor thereof, an amic acid, is well known in the art, and the method of preparing a polyimide with the thermal or chemical imidization is well known in the art, as well.

In the present description, the term 'poly(imide-amide)' should be interpreted as implying the term 'poly(amic acid-amide)' as well. That is, the term 'poly(imide-amide)' implies the term 'poly(imide-amide)', which is 100% imidized, the term 'poly(amic acid-amide)', which is not imidized at all, and also the term 'poly((imide or amic acid)-amide)', which is partially imidized.

In an exemplary embodiment, the dianhydride reacting with the diamine including a diamine represented by above Chemical Formula 1 may be represented by following Chemical Formula 5:

Chemical Formula 5

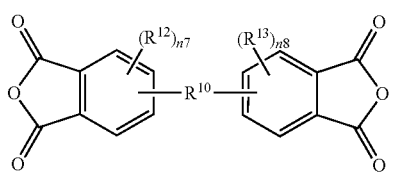

In Chemical Formula 5, $R^{10}$ is a substituted or unsubstituted C1 to C30 aliphatic group, a substituted or unsubstituted C3 to C30 alicyclic organic group, a substituted or unsubstituted C6 to C30 aromatic organic group, or a substituted or unsubstituted C2 to C30 heterocyclic group, $R^{12}$ and $R^{13}$ are the same or different and are each independently a halogen, a hydroxyl group, a substituted or unsubstituted C1 to C10 aliphatic group, a substituted or unsubstituted C6 to C20 aromatic group, an alkoxy group of formula —$OR^{205}$, wherein $R^{205}$ is a C1 to C10 aliphatic organic group, or a silyl group of formula —$SiR^{209}R^{210}R^{211}$, wherein $R^{209}$, $R^{210}$, and $R^{211}$ are the same or different and are each independently a hydrogen, or a C1 to C10 aliphatic organic group, and n7 and n8 are the same or different and are each independently an integer ranging from 0 to 3.

The dianhydride represented by above Chemical Formula 5 may be represented by following Chemical Formula 6, Chemical Formula 7, or a combination thereof:

Chemical Formula 6

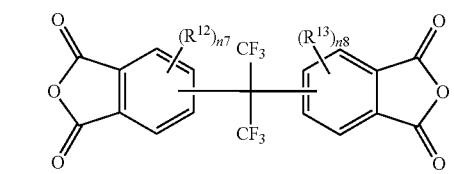

Chemical Formula 7

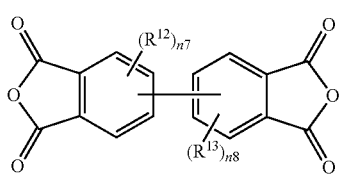

In above Chemical Formulae 6 and 7, $R^{12}$ and $R^{13}$ are the same or different, and are each independently a halogen, a hydroxy group, a substituted or unsubstituted C1 to C10 aliphatic organic group, a C6 to C20 aromatic organic group, an alkoxy group of formula —$OR^{208}$, wherein $R^{208}$ is a C1 to C10 aliphatic organic group, or a silyl group of formula —$SiR^{209}R^{210}R^{211}$, wherein $R^{209}$, $R^{210}$, and $R^{211}$ are the same or different, and are each independently hydrogen or a C1 to C10 aliphatic organic group, and n7 and n8 are each independently integers ranging from 0 to 3.

The diamine may further include another diamine, in addition to the diamine represented by above Chemical Formula 1.

The diamine represented by above Chemical Formula 1 to prepare a repeating unit of an imide includes an aramid structure (an amide including an aromatic group) between two terminal amino groups, and thus the procedure accompanied by production of the by-product HCl, which is produced in the process of preparing an amide unit during conventional method of preparing a poly(imide-amide) copolymer, is not required. An imide repeating unit, not the aramide repeating unit, can be prepared by reacting a diamine with a dianhydride, during which the by-product HCl, is not produced. Therefore, any diamine capable of reacting with a dianhydride to form an imide or its precursor of an amic acid can be used to form an imide repeating unit. Accordingly, the poly(imide-amide) copolymer may be prepared by further reacting an additional diamine, other than the diamine represented by above Chemical Formula 1, with a dianhydride.

For example, the additional diamine may be a diamine that is used to prepare a diamine represented by above Chemical Formula 1. For example, the additional diamine may include diamine represented by following Chemical Formula 2-1, Chemical Formula 3-1, Chemical Formula 4-1, or a combination thereof:

Chemical Formula 2-1

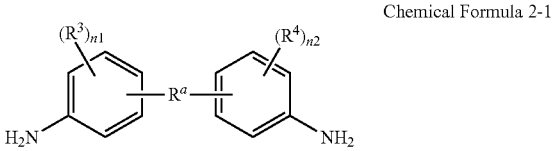

Chemical Formula 3-1

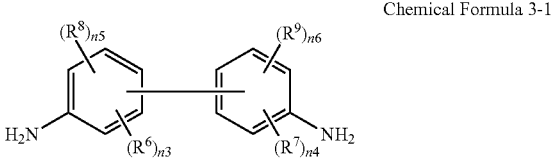

Chemical Formula 4-1

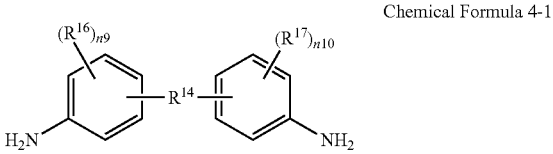

In Chemical Formula 2-1, the definitions of $R^a$, $R^3$, $R^4$, and $n_1$ and $n_2$ are the same as those defined in Chemical Formula 2.

In Chemical Formula 3-1, the definitions of $R^6$ to $R^9$, and $n_3$ to $n_6$ are the same as those defined in Chemical Formula 3.

In Chemical Formula 4-1, the definitions of $R^{14}$, $R^{16}$, and $R^{17}$, and $n_9$ and $n_{10}$ are the same as those defined in Chemical Formula 4.

Particularly, in above Chemical Formula 2-1, $R^a$ may be selected from following chemical formulae.

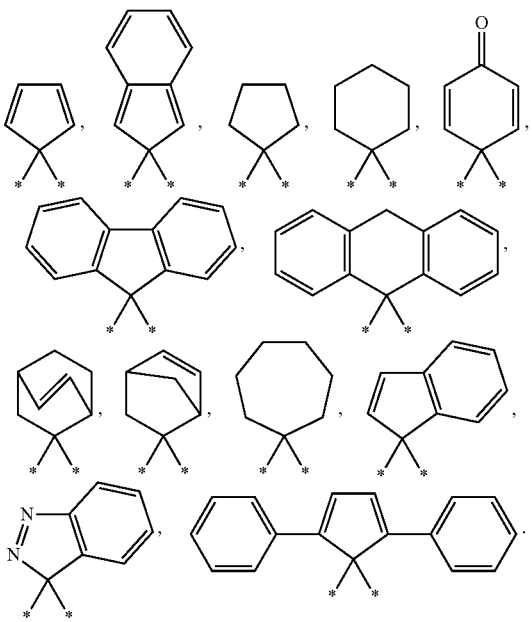

Particularly, in Chemical Formula 3-1, $R^6$ and $R^7$ may be the same or different, and may be each independently selected from —$CF_3$, —$CCl_3$, —$CBr_3$, —$Cl_3$, —$NO_2$, —$CN$, —$C(=O)CH_3$, and —$CO_2C_2H_5$.

Particularly, in Chemical Formula 4-1, $R^{14}$ may be $SO_2$, and both of $n_9$ and $n_{10}$ may be the integer of 0.

For example, the additional diamine may include 4,4'-(9-fluorenylidene)dianiline ("BAPF"), 2,2'-bis(trifluoromethyl)benzidine ("TFDB"), 2,7-diaminofluorene, 1,1-bis(4-aminophenyl)cyclohexane, 4,4'-methylenebis-(2-methylcyclohexylamine), 4,4-diaminooctafluorobiphenyl, 3,3'-dihydroxybenzidine, 1,3-cyclohexanediamine, or a combination thereof, but is not limited thereto.

The dianhydride represented by above Chemical Formula 5 may include, for example, 2,2-bis-(3,4-dicarboxyphenyl)hexafluoropropane dianhydride ("6FDA"), 3,3',4,4'-biphenyltetracarboxylic dianhydride ("BPDA"), benzophenone tetracarboxylic dianhydride ("BTDA"), bis(3,4-dicarboxyphenyl)sulfone dianhydride, or a combination thereof, but is not limited thereto.

The poly(imide-amide) copolymer may be represented by following Chemical Formula 8:

Chemical Formula 8

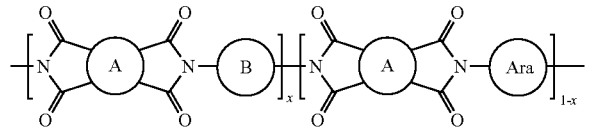

In Chemical Formula 8,

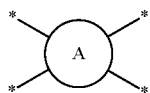

may be derived from a dianhydride that reacts with a diamine to prepare an imide, and may be represented by following Chemical Formula 5-1.

Chemical Formula 5-1

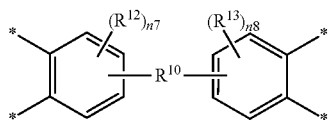

In Chemical Formula 5-1, the definitions of $R^{10}$, $R^{12}$, $R^{13}$, and n7 and n8 are the same as those defined in above Chemical Formula 5.

Chemical Formula 5-1 may be represented by following Chemical Formula 6-1 or Chemical Formula 7-1.

Chemical Formula 6-1

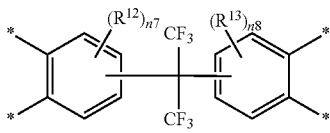

Chemical Formula 7-1

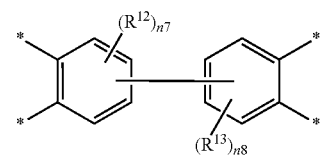

In Chemical Formulae 6-1 and Chemical Formula 7-1, the definitions of $R^{12}$, $R^{13}$, and $n_7$ and $n_8$ are the same as those defined in above Chemical Formula 6 and Chemical Formula 7, respectively.

In Chemical Formula 8,

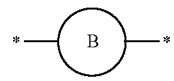

may be derived from a diamine that can react with a dianhydride to prepare an imide. For example, the definition of

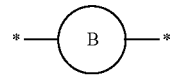

may be the same as that of $Ar_1$ or of $Ar_2$ in above Chemical Formula 1. For example,

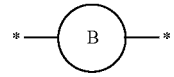

may be represented by above Chemical Formula 2 or above Chemical Formula 3.

In Chemical Formula 8,

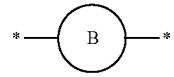

may be derived from above Chemical Formula 1, which may correspond to the structure deleting the two amino groups at both ends of Chemical Formula 1, and may be represented by following Chemical Formula 9:

Chemical Formula 9

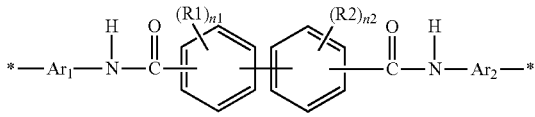

In Chemical Formula 9, the definitions of $R^1$, $R^2$, $Ar_1$, $Ar_2$, and $n_1$ and $n_2$ are the same as those in Chemical Formula 1, respectively.

In Chemical Formula 8, x indicates the mole fraction of the unit represented by x based on 1 mole of the copolymer represented by Chemical Formula 8, i.e., $0 \leq x < 1$.

In Chemical Formula 8, the ratio of x:(1−x) may be from about 1:99 to about 99:1, for example, from about 5:95 to about 95:5, for example, from about 10:90 to about 90:10.

The copolymer may have an amino group at both ends thereof.

The copolymer may have an anhydride group at both ends thereof.

The copolymer may have an amino group at one end thereof, and may have an anhydride group at the other end thereof.

A diamine reacts with an anhydride in a mole ratio of 1:1 to prepare an imide, and thus, the copolymer prepared by reacting a diamine and a dianhydride in a mole ratio of about 1:1 may have amino end groups and anhydride end groups in a mole ratio of about 1:1. In this case, the copolymer may include a copolymer having an amino group at both ends thereof, a copolymer having an anhydride group at both ends thereof, and a copolymer having an amino group at one end and an anhydride group at the other end thereof. However, if either one of a diamine or a dianhydride exists in excess, the copolymer prepared therefrom may include a copolymer having an amino group at both ends thereof, or a copolymer having an anhydride group at both ends thereof, which is well known in the art.

According to another embodiment, provided is a method of preparing a poly(imide-amide) copolymer including reacting a diamine including a diamine represented by Chemical Formula 1 and an dianhydride represented by Chemical Formula 5 to separately prepare a poly(imide-amide) oligomer having an amino group at both ends thereof and a poly(imide-amide) oligomer having an anhydride at both ends thereof, and mixing and polymerizing the prepared two types of poly(imide-amide) oligomers in a mole ratio of about 1:1 to prepare a poly(imide-amide) copolymer.

When being used in an LCD substrate from about 200,000 centipoise ("cP") to about 300,000 cP of viscosity is required, a relatively low viscosity solution is required for spin coating in a process for preparing an OLED. In order to make a low viscosity solution, the solid content should be very low, which is not suitable for the process of manufacturing OLED. Further, if the molecular weight is low, CTE becomes high. Therefore, in order to meet low CTE and high optical properties, it is desirable that the composition is in liquid state while coating, and if the composition is in solid state after being cured.

According to the above method, since the two oligomers, one of which is a poly(imide-amide) oligomer having an amino group at both ends thereof, and the other is a poly(imide-amide) oligomer having an anhydride group at both ends thereof, are prepared in separate, and mixed immediately to be polymerized and cured for use, it is possible to prepare a poly(imide-amide) copolymer having desired viscosity and molecular weight.

In the above method, as the two types of oligomers are mixed in-situ when used, there is no need to include an excess of any one type of the oligomers, and the poly(imide-amide) oligomer having an amino group at both ends thereof and the poly(imide-amide) oligomer having an amino group at both ends thereof may be mixed in a mole ratio of about 1:1, whereby the prior art's problems due to excess of any one type of oligomers can be addressed. That is, for example, the problem of color change at a high temperature when using excess of amine-terminated oligomers, or the problem of not being polymerized when using excess of anhydride-terminated oligomers is solved.

Each of the poly(imide-amide) oligomer having an amino group at both ends thereof and the poly(imide-amide) oligomer having an anhydride group at both ends thereof may have a weight average molecular weight of about 10,000 grams per mole ("g/mol") to about 20,000 g/mol. Within the above range of molecular weight, the composition including the oligomers may maintain sufficiently low viscosity to be applied with spin-coating when mixing the oligomers, and thus suitable for preparing a substrate for electronic devices, such as an OLED.

In an exemplary embodiment, the poly(imide-amide) oligomer having an anhydride at both ends thereof may have a larger weight average molecular weight than the poly(imide-amide) oligomer having an amino group at both ends thereof. The poly(imide-amide) oligomer having an anhydride at both ends thereof may be chemically imidized prior to being mixed with the poly(imide-amide) oligomer having an amino group at both ends thereof, which allows the resulting copolymer to have reduced CTE. Particularly, as shown in the Examples, as the content of the poly(imide-amide) oligomer having an anhydride group at both ends thereof increases, CTE of the prepared copolymer decreases. That is, the poly(imide-amide) oligomer having an anhydride group at both ends thereof may be partially or fully imidized prior to being mixed with the poly(imide-amide) oligomer having an amino group at both ends thereof to reduce CTE of the copolymer prepared therefrom. The reason is that the anhydrous acetic acid, a chemical imidization agent, cannot react with an amine, and thus the chemical imidization can only be performed with an oligomer having an anhydride group at its terminal end. If the poly(imide-amide) oligomer having an anhydride at both ends thereof has a larger weight average molecular weight than the poly(imide-amide) oligomer having an amino group at both ends thereof and is partially or fully imidized, CTE of the copolymer prepared therefrom becomes further reduced, as higher imidization due to higher molecular weight of the oligomer having an anhydride group at both ends thereof can be performed.

Although the ratio of the weight average molecular weights between the oligomers having an anhydride group at both ends thereof and the oligomers having an amino group at both ends thereof to reduce CTE is not specifically limited, it may be from about 0.7 to about 0.95, in an exemplary example. That is, although CTE generally reduces when the poly(imide-amide) oligomer having an anhydride at both ends thereof has a larger weight average molecular weight than the poly(imide-amide) oligomer having an amino group at both ends thereof, the ratio of the molecular weight between the two oligomers can be adjusted depending on the type or the molecular weight of each oligomer.

As described above, the above method may further include chemical imidization of the poly(imide-amide) oligomer having an anhydride at both ends thereof prior to being mixed with the poly(imide-amide) oligomer having an amino group at both ends thereof. The chemical imidization may be partial or full imidization of the amic acid in the oligomer. As is apparent from the Examples, as the content of the poly(imide-amide) oligomer increases, CTE of the prepared copolymer decreases.

The above method may further include spin-coating of the mixture of the oligomers on the substrate, if an article including the copolymer is a film. As mentioned above, in the above method, the poly(imide-amide) oligomer having an anhydride group at both ends thereof and the poly(imide-amide) oligomer having an amino group at both ends thereof are prepared in separate, and mixed and polymerized in-situ, the mixture can maintain low viscosity right after mixing, thus allowing the mixture to be coated on a substrate by spin-coating.

According to yet another embodiment, provided is an article including the poly(imide-amide) copolymer prepared by using the above method.

Particularly, the article may be a film, a fiber, a coating material, or an adhesive.

As described above, the method of preparing a poly(imide-amide) copolymer according to the above embodiment includes mixing and polymerizing the poly(imide-amide) oligomer having an anhydride group at both ends thereof and the poly(imide-amide) oligomer having an amino group at both ends thereof in a mole ratio of about 1:1, and thus the poly(imide-amide) copolymer resulting therefrom has a higher molecular weight without molecular weight loss during polymerization. Accordingly, the obtained poly(imide-amide) copolymer may have a higher light transmittance and lower CTE.

Further, CTE of the poly(imide-amide) copolymer may become even lower by chemically imidizing a poly(imide-amide) oligomer having an anhydride group at both ends thereof prior to mixing the same with a poly(imide-amide) oligomer having an amino group at both ends thereof.

Therefore, the poly(imide-amide) copolymer prepared by the method according to the above embodiment may have highly improved optical and thermal properties, such as, enhanced light transmittance, lowered yellowness index, reduced CTE, increased glass transition temperature, etc.

Accordingly, the article including the poly(imide-amide) copolymer according to the above embodiment may also have excellent optical and thermal properties.

For example, the article may have total light transmittance of greater than or equal to about 80%, for example greater than or equal to about 85%, in a wavelength range of 380 nanometers to 750 nanometers, and the article may have light transmittance of greater than or equal to about 80%, for example greater than or equal to about 81%, in a wavelength of 430 nanometers. Within the above range of light transmittance, the article may have excellent color reducibility.

The article may have a coefficient of thermal expansion ("CTE") of less than or equal to about 25 ppm/° C., for example, of less than or equal to about 23 ppm/° C., or for example, of less than or equal to about 20 ppm/° C.

The article may have a yellowness index ("YI") of less than or equal to about 5%. Within the above range of yellowness index, the article may be colorless and transparent.

The article may have a glass transition temperature ("Tg") of greater than or equal to about 300° C., for example, of greater than or equal to about 320° C.

The article including a poly(imide-amide) copolymer according to the above embodiment, for example, a film, may have a thickness of about 0.01 micrometers ("µm") to about 1,000 µm, but is not limited thereto. The thickness of the article may be appropriately controlled depending on its use.

The article may have excellent transparency, heat resistance, mechanical strength, and flexibility by including a poly(imide-amide) copolymer having excellent transparency, heat resistance, mechanical strength, and flexibility. Therefore, the article may be used as a substrate for a device, a substrate for display, an optical film, IC package, an adhesive film, a multiple flexible printed circuit ("FRC"), a tape, a touch panel, a protecting film for a photo disc, etc.

According to yet another embodiment, provided is a display device including the article. Particularly, the display device may include an LCD (liquid crystal display device), an OLED (organic light emitting diode), etc., but is not limited thereto.

Among the display devices, a liquid crystal display (LCD) is described by referring to FIG. 1. FIG. 1 is a cross-sectional view of a liquid crystal display (LCD) in accordance with an embodiment.

Referring to FIG. 1, the liquid crystal display (LCD) includes a thin film transistor array panel 100, a common electrode panel 200 facing the thin film transistor array panel 100, and a liquid crystal layer 3 interposed between the two panels 100 and 200.

First, the thin film transistor array panel 100 will be described.

A gate electrode 124, a gate insulating layer 140, a semiconductor 154, a plurality of ohmic contacts 163 and 165, a source electrode 173 and a drain electrode 175 are sequentially disposed on a substrate 110. The source electrode 173 and the drain electrode 175 are isolated from each other and they face each other with the gate electrode 124 between them.

One gate electrode 124, one source electrode 173, and one drain electrode 175 constitute one thin film transistor (TFT) together with the semiconductor 154, and a channel of the thin film transistor is formed in the semiconductor 154 between the source electrode 173 and the drain electrode 175.

A protective layer 180 is disposed on the gate insulating layer 140, the source electrode 173, and the drain electrode 175, and a contact hole 185 that exposes the drain electrode 175 is formed in the protective layer 180.

A pixel electrode 191 formed of a transparent conductive material such as ITO or IZO is disposed on the protective layer 180. The pixel electrode 191 is connected to the drain electrode 175 through the contact hole 185.

The common electrode panel 200 will now be described.

In the common electrode panel 200, a lighting member 220 referred to as a black matrix is disposed on a substrate 210, a color filter 230 is disposed on the substrate 210 and the lighting member 220, and a common electrode 270 is formed on the color filter 230.

Herein, the substrates 110 and 210 may be articles including the composite including the poly(amide-imide) copolymer and inorganic particles.

Figure 2:
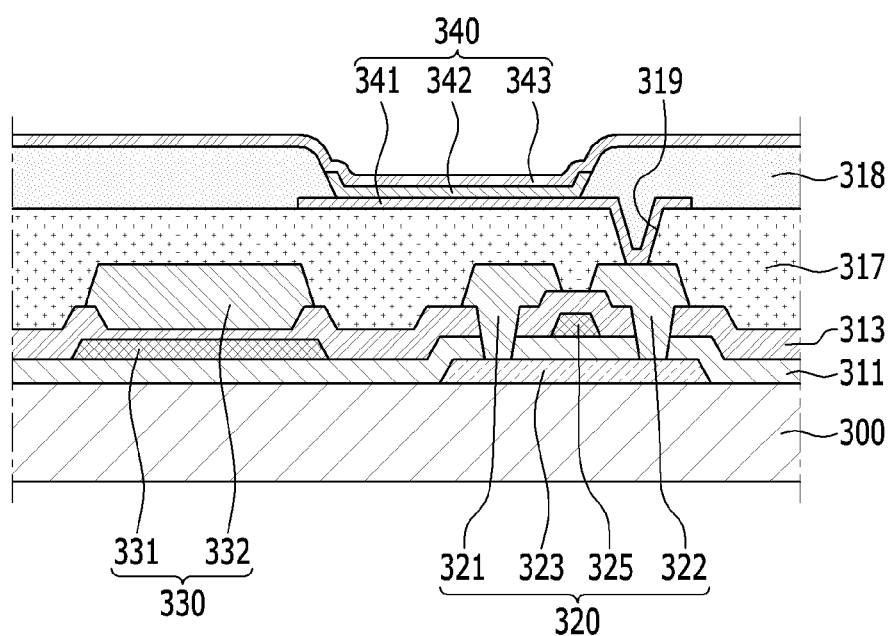
FIG. 2 is a cross-sectional view of an organic light emitting diode ("OLED") in accordance with an embodiment.

Among the display devices, an organic light emitting diode ("OLED") is described by referring to FIG. 2. FIG. 2 is a cross-sectional view of an organic light emitting diode ("OLED") in accordance with an embodiment.

Referring to FIG. 2, a thin film transistor 320, a capacitor 330, and an organic light emitting element 340 are formed on a substrate 300. The thin film transistor 320 includes a source electrode 321, a semiconductor layer 323, a gate electrode 325, and a drain electrode 322, and the capacitor 330 includes a first capacitor 331 and a second capacitor 332. The organic light emitting element 340 includes a pixel electrode 341, an intermediate layer 342, and an opposed electrode 343.

According to an embodiment, the semiconductor layer 323, a gate insulating layer 311, the first capacitor 331, the gate electrode 325, an interlayer insulating layer 313, the second capacitor 332, the source electrode 321, and the drain electrode 322 are formed on the substrate 300. The source electrode 321 and the drain electrode 322 are isolated from each other, and they face each other with the gate electrode 325 between them.

A planarization layer 317 is on the interlayer insulating layer 313, the second capacitor 332, the source electrode 321, and the drain electrode 322, and the planarization layer 317 includes a contact hole 319 that exposes the drain electrode 322.

The pixel electrode 341 formed of a transparent conductive material such as ITO or IZO is on the planarization layer 317. The pixel electrode 341 is connected to the drain electrode 322 through the contact hole 319.

The intermediate layer 342 and the opposed electrode 343 are sequentially on the pixel electrode 341.

A pixel defining layer 318 is formed in a portion where the pixel electrode 341, the intermediate layer 342, and the opposed electrode 343 are not formed on the planarization layer 317.

Herein, the substrate 300 may be formed into an article including the composite including the poly(amide-imide) copolymer and inorganic particles.

Hereafter, the technology of this disclosure is described in detail with reference to examples. The following examples and comparative examples are not restrictive but are illustrative.

EXAMPLES

Synthesis Example 1

Synthesis of a Diamine Monomer, DA119, Containing an Aramide Group

A diamine monomer named as DA119' having an aramid structure therein is prepared by the following Reaction Scheme 2.

therein and dried at 90° C. under vacuum, obtaining the DA119 monomer described in the Reaction Scheme 2.

Figure 5A:
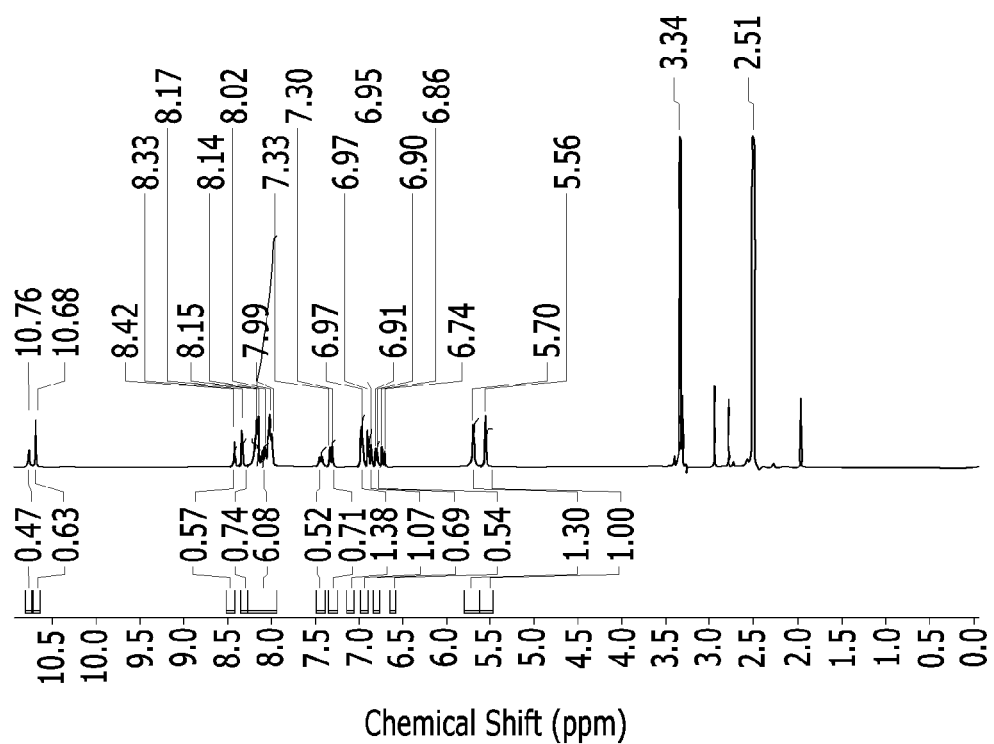
FIGS. 5A and 5B are graphs of peak intensity versus chemical shift (parts per million, ppm) illustrating $^1$H NMR spectra of DA-119, a diamine prepared in Example 1.
Figure 5B:
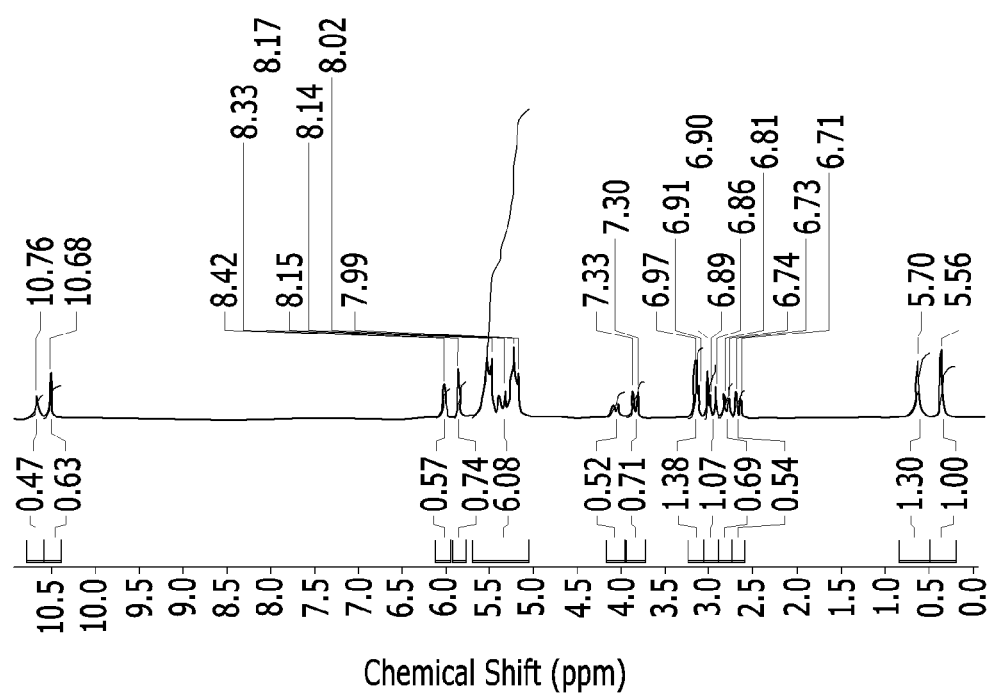

FIG. 5A and FIG. 5B are $^1$H NMR spectra of prepared DA-119. FIG. 5B is a magnified view of a part of FIG. 5A. As shown from FIGS. 5(a) and 5(b), $^1$H NMR spectra represent the existence of two types of amino groups at 5.56 parts per million ("ppm") and 5.70 ppm, at which two single peaks are represented. While the single peak at 5.56 ppm indicates the amino group in the unreacted TFDB monomer, the single peak at 5.70 ppm seems to indicate the amino group at the terminal end of the oligomeric mixture. Further, as shown from FIGS. 5(a) and 5(b), the single peaks at 10.68 ppm and 10.76 ppm (ratio of respective peak intensity is 1:0.75) correspond to the amido groups of the oligomeric mixture. While the amido groups of the TFDB at the terminal ends represent a signal at 10.68 ppm, the amido groups of the TFDB within the molecule represent a signal at 110.76 ppm.

Reaction Scheme 2

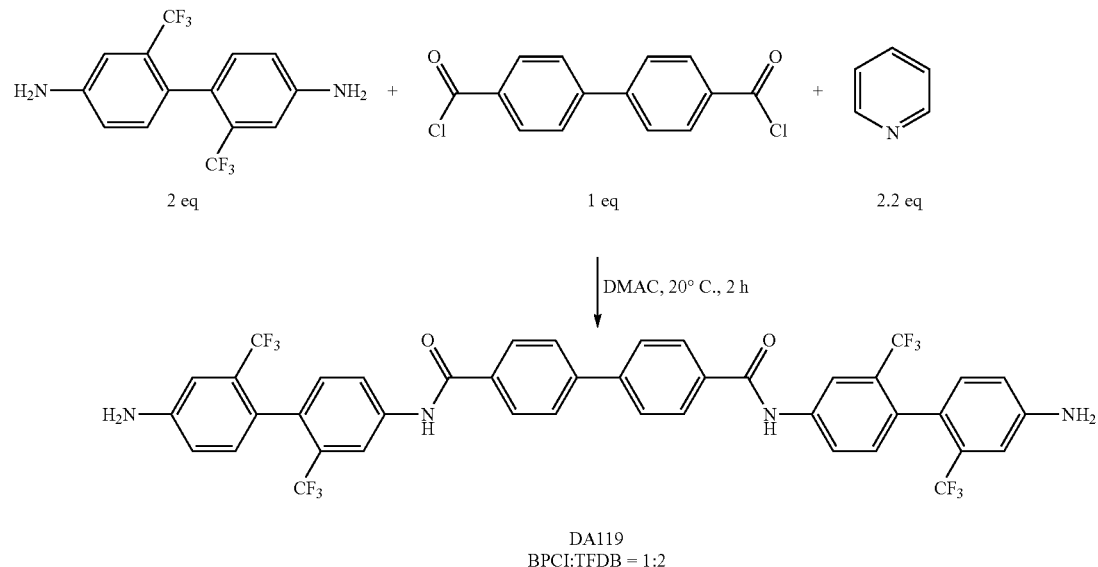

DA119
BPCl:TFDB = 1:2

Particularly, the DA119 monomer corresponding to an amide unit is prepared by dissolving 2 mol equivalent (0.08 mol, 25.6192 g) of 2,2'-bis(trifluoromethyl)benzidine ("TFDB") and 2.2 mol equivalent (0.088 mol, 6.96 g) of pyridine in 800 g of N,N-dimethylacetamide as a solvent in a round-bottomed flask and washing the TFDB using 80 ml of DMAC. Next, 11.1648 g (1 mol equivalent, 0.04 mol) of BPCl (biphenyl dicarbonyl chloride) is divided into four portions and added one at a time (for a total of four additions) to the TFDB solution at 5° C. The mixture is vigorously agitated for 15 minutes.

The resulting solution is agitated under a nitrogen atmosphere for 2 hours, and then added to 7 L of water including 1 kg of NaCl. The mixture is cooled down to 0° C. The cooled mixture is maintained at 0° C. for 12 hours, completing precipitation of an organic material. The solid precipitate is filtered and then re-suspended four times with 1.5 L of deionized water and re-filtered. The filtered product is appropriately pressurized to remove as much water as possible therein and dried through a nitrogen stream until it has a constant weight. The pre-dried product is further maintained in vacuum desiccators having sodium hydroxide and nitrogen atmosphere for 36 hours to remove water still remaining

Examples 2 to 5 and Comparative Example 1

Synthesis of a Poly(Imide-Amide) Oligomer Using DA-119

The aramide containing diamine, DA-119, which was prepared in Example 1, an additional diamine, and a dianhydride were polymerized to prepare a poly(imide-amide) copolymer. In this case, although the process is performed in the same way, an amine-terminated or an anhydride-terminated poly(imide-amide) copolymer is obtained depending on the content of the diamine or dianhydride. In Examples 2 to 5, anhydride-terminated oligomers and amine-terminated oligomers are prepared in separate with the composition described in below Table 1. Hereinafter, the process of preparing amine-terminated or anhydride-terminated poly(imide-amide) copolymer (oligomer) is described.

First, DA-119, prepared in Synthesis Example 1, is charged into a 250 ml 4-neck double walled reactor, pre-heated to 80° C. and equipped with a mechanical stirrer and a nitrogen inlet, and NMP as a solvent is added. DA-119 solution was stirred at 80° C. under a nitrogen atmosphere until the monomer is completely dissolved. If necessary, an additional diamine is added to the solution. In Examples 2 to 5, TFDB is added as an additional diamine in an amount described in Table 1. Temperature was decreased to 20° C., and anhydrides, such as, 6FDA and BPDA, are slowly added to the diamine solution in an amount described in below Table 1. Then, additional NMP is added, and the solution is stirred for 48 hrs to obtain oligo(amide-amic acid) solution.

The resulting oligo(amide-amic acid) is an amine-terminated or an anhydride-terminated poly(amide-amic acid) copolymer having the composition described in below table 1.

Meanwhile, the aramide structure containing diamine, DA-119, prepared in Example 1, is not used in Comparative Example 1. In Comparative Example 1, TFDB and BPCl (biphenyl dicarbonyl chloride) are polymerized to prepare an aramide structure, and a poly(imide-amide) copolymer is prepared by adding 6FDA to the aramide structure, as in the conventional method. The composition of Comparative Example 1 is also described in below Table 1. In Comparative Example 1, the amine-terminated and the anhydride-terminated copolymer are prepared simultaneously in the same batch with the composition describe in below Table 1. In Table 1 below, all units are grams (g).

terminal end thereof to imidize 100% of the amic acid units in the oligomer, followed by mixing the oligomer with another oligomer having an amino group at both terminal ends thereof.

The mixture of the oligomer is added on a glass substrate (5×5 cm) by drop wise and spin-coated at a rate of 800 revolutions per minute ("rpm"). The spin-coating solution is previously dried on a hot plate of 80° C. for 1 hour to evaporate excess of solvent. The glass substrate is heated at a rate of 3° C./min in $N_2$ atmosphere, and the film is fabricated by annealing at 320° C. for 1 hour.

A poly(imide-amide) copolymer prepared in Comparative Example 1 has one component, and thus is directly added on a glass substrate (5×5 cm) by drop wise, casted, and annealed to fabricate a film in the same way as the copolymers according to the Examples.

Evaluation: Physical Properties of a Poly(Imide-Amide) Copolymer Film

The films fabricated from Examples 2 to 5, and Comparative Example 1 are evaluated regarding optical properties and thermal properties, and the results are described in Table 2 below.

TABLE 2

|  | Thickness of film (μm) | Transparency @ 380 nm to 750 nm (%) | Transparency @ 430 nm (%) | Yellowness Index (YI) (%) | CTE (ppm/° C.) (50~300° C.) | Glass Transition Temperature (Tg)(° C.) |
| --- | --- | --- | --- | --- | --- | --- |
| Example 2 | 9 | 88.24 | 85.16 | 2.46 | 20.7 | 326 |
| Example 3 | 9 | 87.71 | 84.64 | 2.46 | 14.43 | 325 |
| Example 4 | 10 | 86.79 | 81.62 | 4.25 | 15.68 | 343 |
| Example 5 | 10 | 86.77 | 83.31 | 3.58 | 13.65 | 346 |
| Comparative Example 1 | 10 | 86.53 | 74.32 | 9.24 | 55.98 | 310 |

TABLE 1

|  | Terminal Group | 6FDA | BPDA | TFDB | DA119 | BPCI |
| --- | --- | --- | --- | --- | --- | --- |
| Example 2 | anhydride | 15.37 | 35.88 | 19.22 | 29.56 | — |
| | amine | 14.63 | 34.15 | 22.03 | 29.19 | — |
| Example 3 | anhydride | 6 | 50 | 26 | 19 | — |
| | amine | 4 | 40 | 41 | 14 | — |
| Example 4 | anhydride | 15.37 | 35.88 | 19.22 | 29.56 | — |
| | amine | 14.63 | 34.15 | 22.03 | 29.19 | — |
| Example 5 | anhydride | 15.37 | 35.88 | 19.22 | 29.56 | — |
| | amine | 13.78 | 32.16 | 30.22 | 22.83 | — |
| Com. Exam. 1 | | 21.05 | — | 52.70 | — | 24.33 |

Synthesis Example

Synthesis of a Poly(Imide-Amide) Copolymer Film

The amine-terminated oligomers and the anhydride-terminated oligomers according to Examples 2 to 5 are mixed, and casted on a substrate, followed by being cured to fabricate poly(imide-amide) copolymer films.

Particularly, the oligomers having an amino group at both terminal end thereof and copolymers having an anhydride group at both terminal end thereof according to the examples are mixed, the mixed solution are casted on a substrate and cured to form a poly(imide-amide) copolymer film. Meanwhile, in case of Example 4 and Example 5, before mixing the oligomers, 61.48 g of anhydrous acetic acid in pyridine is added to the oligomer having an anhydride group at both As shown from above Table 2, the poly(imide-amide) copolymer film according to the embodiments has very low CTE and high glass transition temperature ("Tg") compared to the copolymer of Comparative Example 1, and thus the poly(imide-amide) copolymer according to the examples are tough thermally very stable.

Further, regarding the optical properties, the poly(imide-amide) copolymers according to the examples has very low YI and high transmittance at 430 nm compared to the film according to Comparative Example 1, and thus the optical properties of the copolymers have also been highly enhanced.

Figure 3:
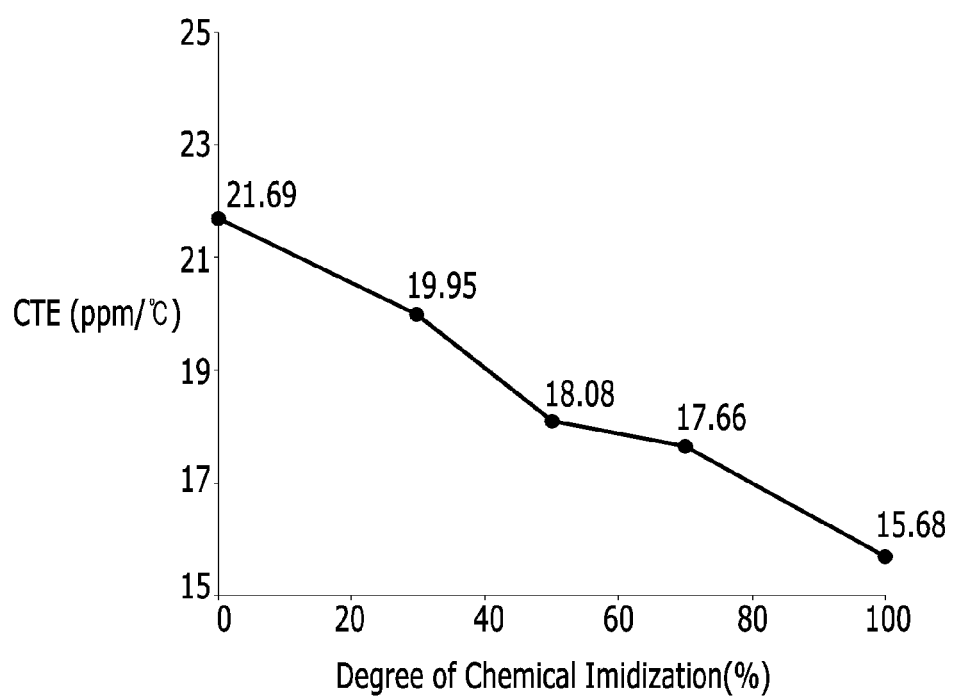
FIG. 3 is a graph of coefficient of thermal expansion ("CTE") (parts per million per degree Centigrade, ppm/° C.) versus degree of chemical imidization (percent, %) showing changes of CTE of films including poly(imide-amide) copolymers, depending on the proportions of imidization of a poly(imide-amide) oligomer having an anhydride group at both ends thereof.

Meanwhile, the poly(imide-amide) copolymer films according to Example 4 and Example 5 have further lower CTE and even higher Tg than other copolymer films. This is because the oligomer having an anhydride group at both terminal ends thereof is previously imidized by the addition of the anhydrous acetic acid to imidize 100% of the amic acid units in the oligomer. In this regard, in order to CTE change depending on the degree of chemical imidization of the oligomer having an anhydride group at both ends thereof, previous imidization of the oligomer having an anhydride group at both ends thereof is performed at 0%, 30%, 50%, and 70% respectively, prior to mixing the oligomer with another oligomer according to Example 4, and CTE is determined for the copolymer films prepared therefrom. The results are represented in FIG. 3. As shown in FIG. 3, the higher the degree of imidization, the lower CTE of the poly(imide-amide) film.

Figure 4:
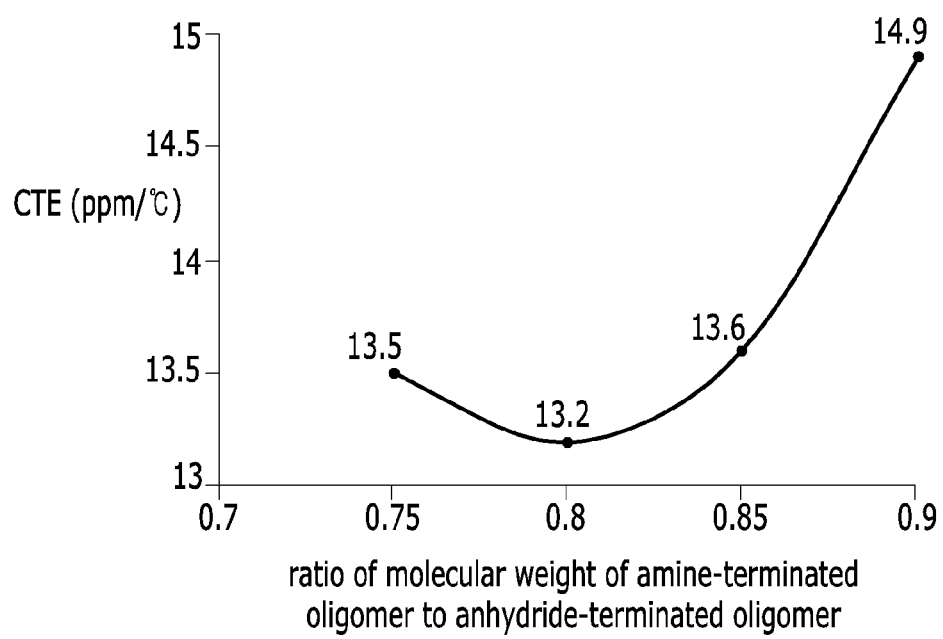
FIG. 4 a graph of coefficient of thermal expansion ("CTE") (parts per million per degree Centigrade, ppm/° C.) versus ratio of molecular weight of amine-terminated oligomer to anhydride-terminated oligomer showing changes of CTE of films including poly(imide-amide) copolymers, depending on the ratios of the weight average molecular weight of the poly(imide-amide) oligomer having an amino group at both ends thereof to that of the poly(imide-amide) oligomer having an anhydride group at both ends thereof.

Further, CTE of the film according to Example 5 is lower than that of the film according to Example 4. This is because the ratio of the molecular weight of the oligomer having an anhydride group at both ends thereof to that of the oligomer having an amino group at both ends thereof according to Example 5 is greater than that of Example 4. That is, when the molecular weight of an oligomer having an anhydride group at both ends thereof, which is able to be imidized, is greater than that of an oligomer having an amino group at both ends thereof, it is believed that much lower CTE is obtained due to imidization of more amic acid units in the oligomer having an anhydride group at both ends thereof. In order to confirm this, the ratio of the molecular weights of an oligomer having an amino at both ends thereof to an oligomer having an anhydride group at both ends thereof has been changed to 0.9, 0.85, 0.8, and 0.75, respectively, and the oligomers are mixed and cured to form a poly(imide-amide) film, for which CTE change has been determined. In this case, the oligomer having an anhydride group at both ends thereof is previously chemically imidized prior to being mixed with another oligomer having an amino group at both ends thereof. The results are represented in FIG. 4. As shown from FIG. 4, if the molecular weight of the oligomer having an amino group at both ends thereof is less than that of the oligomer having an anhydride group at both ends thereof, that is the ratio of the molecular weight of the oligomer having an amino group at both ends thereof to that of the oligomer having an anhydride group at both ends thereof is less than 1.0, CTE gradually decreases as the ratio decreases to 0.8, at which CTE is the lowest. If the ratio of the molecular weight of the oligomer having an amino group at both ends thereof to that of the oligomer having an anhydride group at both ends thereof is less than 0.8, for example, if the ratio is 0.75, however, CTE becomes higher again. However, from the results of FIG. 4, it is understood that if the molecular weight of an oligomer having amine ends is less than that of an oligomer having anhydride ends, that is, the ratio of the molecular weight of the oligomer having amine ends to that of the oligomer having anhydride ends is less than 1.0, lower CTE is able to be obtained. Further, it is understood that there is some proper ratio of the molecular weights between the oligomer having amine ends and the oligomer having anhydride ends to obtain the lowest CTE, depending on the type and molecular weight of a diamine and an anhydride forming an oligomer having an amine end or an oligomer having an anhydride end.

Meanwhile, the thinner the thickness of a poly(imide-amide) film according to the embodiment, the better the optical properties of the film. As shown from the above Table 2, transmittance of a thinner film (Example 2 or 3) is higher than that of a thicker film (Example 4 or Example 5), and yellowness index (YI) of a thinner film (Example 2 or 3) is lower than that of a thicker film (Example 4 or Example 5). On the contrary, the film according to Comparative Example 1, having the same thickness of 10 μm as that of the films according to Examples 4 and 5, has much lower transmittance, especially at 430 nm, than that of the films according to Examples 4 and 5, and has much higher YI, 9.24, than that of the film according to Example 4 (YI=4.25) or Example 5 (YI=3.58). That is, even though the thicknesses of films are the same as each other, the optical properties of the films according to the embodiments are superior to those of the film according to Comparative Example 1.

Therefore, it is understood that the poly(imide-amide) copolymer according to the embodiment enables manufacturing articles having excellent thermal stability and improved optical properties, which can be advantageously used in various devices, such as, display devices requiring excellent optical and thermal properties.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A composition of preparing a poly(imide-amide) copolymer, comprising:
   (a) a first poly(imide-amide) oligomer comprising an amino group at both ends thereof, and
   (b) a second poly(imide-amide) oligomer comprising an anhydride group at both ends thereof,
   wherein both the first and second poly(imide-amide) oligomers are reaction products of a diamine and a dianhydride, wherein the diamine comprises a diamine represented by Chemical Formula 1 and the dianhydride comprises a dianhydride represented by Chemical Formula 5:

Chemical Formula 1

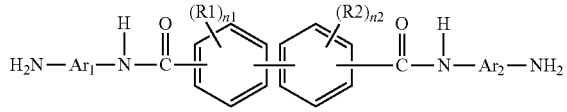

wherein, in Chemical Formula 1,

R1 and R2 are the same or different, and are each independently selected from a halogen, a hydroxyl group, a substituted or unsubstituted C1 to C10 alkyl group, a substituted or unsubstituted C6 to C20 aryl group, or a substituted or unsubstituted C1 to C10 alkoxy group, n1 and n2 are the same or different, and are each independently an integer from 0 to 4, $Ar_1$ and $Ar_2$ are the same or different and are each independently represented by Chemical Formula 2, 3, or 4:

Chemical Formula 2

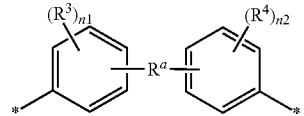

wherein, in Chemical Formula 2, $R^a$ is a substituted or unsubstituted C3 to C30 alicyclic organic group, a substituted or unsubstituted C6 to C30 aromatic organic group, or a substituted or unsubstituted C2 to C30 heterocyclic group, $R^3$ and $R^4$ are the same or different and are each independently a halogen, a hydroxyl group, a substituted or unsubstituted C1 to C10 aliphatic group, a substituted or unsubstituted C6 to C20 aromatic group, an alkoxy group of formula —$OR^{200}$, wherein $R^{200}$ is a C1 to C10 aliphatic organic group, or a silyl group of formula —$SiR^{201}R^{202}R^{203}$, wherein $R^{201}$, $R^{202}$, and $R^{203}$ are the same or different and are each independently a hydrogen or a C1 to C10 aliphatic organic group, and n1 and n2 are the same or different and are each independently an integer ranging from 0 to 4, Chemical Formula 3

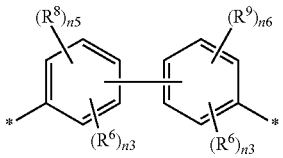

wherein, in Chemical Formula 3,
$R^6$ and $R^7$ are the same or different and are each independently an electron withdrawing group,
$R^8$ and $R^9$ are the same or different, and are each independently a halogen, a hydroxy group, a substituted or unsubstituted C1 to C10 aliphatic organic group, a substituted or unsubstituted C6 to C20 aromatic organic group, an alkoxy group of formula —$OR^{204}$, wherein $R^{204}$ is a C1 to C10 aliphatic organic group, or a silyl group of formula —$SiR^{205}R^{206}R^{207}$, wherein $R^{205}$, $R_{206}$, and $R^{207}$ are the same or different, and are each independently a hydrogen, or a C1 to C10 aliphatic organic group,
n3 is an integer ranging from 1 to 4,
n5 is an integer ranging from 0 to 3,
provided that n3+n5 is an integer ranging from 1 to 4,
n4 is an integer ranging from 1 to 4,
n6 is an integer ranging from 0 to 3,
provided that n4+n6 is an integer ranging from 1 to 4, Chemical Formula 4

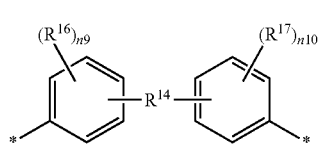

wherein, in Chemical Formula 4,
$R^{14}$ is —O—, —S—, —C(=O)—, —CH(OH)—, —S(=O)$_2$—, —Si(CH$_3$)$_2$—, —(CH$_2$)$_p$—, wherein 1≤p≤10, —(CF$_2$)$_q$—, wherein 1≤q≤10, —C(CH$_3$)$_2$—, —C(CF$_3$)$_2$—, and —C(=O)NH—, or a substituted or unsubstituted C6 to C30 aromatic organic group, wherein the aromatic organic group is one aromatic ring, two or more aromatic rings fused together to provide a condensed ring system, or two or more moieties linked through a single bond or through a functional group selected from a fluorenylene group, —O—, —S—, —C(=O)—, —CH(OH)—, —S(=O)$_2$—, —Si(CH$_3$)$_2$—, —(CH$_2$)$_p$— wherein 1≤p≤10, —(CF$_2$)$_q$— wherein 1≤q≤10, —C(CH$_3$)$_2$—, —C(CF$_3$)$_2$—, and —C(=O)NH—,
$R^{16}$ and $R^{17}$ are the same or different, and are each independently a halogen, a hydroxy group, a substituted or unsubstituted C1 to C10 aliphatic organic group, a substituted or unsubstituted C6 to C20 aromatic organic group, an alkoxy group of formula —$OR^{212}$, wherein $R^{212}$ is a C1 to C10 aliphatic organic group, or a silyl group of formula —$SiR^{213}R^{214}R^{215}$, wherein $R^{213}$, $R^{214}$, and $R^{215}$ are the same or different, and are each independently a hydrogen or a C1 to C10 aliphatic organic group, and
n9 and n10 are each independently an integer ranging from 0 to 4, Chemical Formula 5

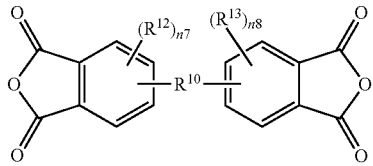

in Chemical Formula 5,
$R^{10}$ is a substituted or unsubstituted C1 to C30 aliphatic group, a substituted or unsubstituted C3 to C30 alicyclic organic group, a substituted or unsubstituted C6 to C30 aromatic organic group, or a substituted or unsubstituted C2 to C30 heterocyclic group,
$R^{12}$ and $R^{13}$ are the same or different and are each independently a halogen, a hydroxyl group, a substituted or unsubstituted C1 to C10 aliphatic group, a substituted or unsubstituted C6 to C20 aromatic group, an alkoxy group of formula —$OR^{205}$, wherein $R^{205}$ is a C1 to C10 aliphatic organic group, or a silyl group of formula —$SiR^{209}R^{210}R^{211}$, wherein $R^{209}$, $R^{210}$, and $R^{211}$ are the same or different and are each independently a hydrogen, or a C1 to C10 aliphatic organic group, and
n7 and n8 are the same or different and are each independently an integer ranging from 0 to 3.

2. The composition of preparing a poly(imide-amide) copolymer according to claim 1, wherein the dianhydride represented by Chemical Formula 5 comprises a dianhydride represented by Chemical Formula 6, Chemical Formula 7, or a combination thereof:

Chemcial Formula 6

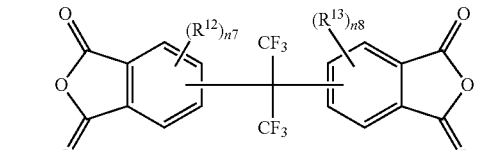

Chemical Formula 7

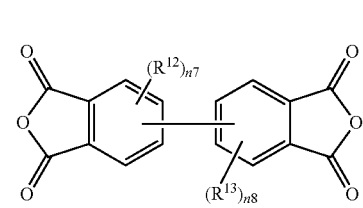

in Chemical Formulae 6 and 7,
$R^{12}$ and $R^{13}$ are the same or different, and are each independently a halogen, a hydroxy group, a substituted or unsubstituted C1 to C10 aliphatic organic group, a C6 to C20 aromatic organic group, an alkoxy group of formula —$OR^{208}$, wherein $R^{208}$ is a C1 to C10 aliphatic organic group, or a silyl group of formula —$SiR^{209}R^{210}R^{211}$, wherein $R^{209}$, $R^{210}$, and $R^{211}$ are the same or different, and are each independently hydrogen or a C1 to C10 aliphatic organic group, and
n7 and n8 are each independently integers ranging from 0 to 3.

3. The composition of preparing a poly(imide-amide) copolymer according to claim 1, wherein the diamine further comprises a diamine represented by Chemical Formula 2-1, Chemical Formula 3-1, Chemical Formula 4-1, or a combination thereof:

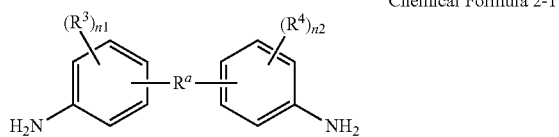

Chemical Formula 2-1 wherein, in Chemical Formula 2-1, $R^a$ is a substituted or unsubstituted C3 to C30 alicyclic organic group, a substituted or unsubstituted C6 to C30 aromatic organic group, or a substituted or unsubstituted C2 to C30 heterocyclic group, $R^3$ and $R^4$ are the same or different and are each independently a halogen, a hydroxyl group, a substituted or unsubstituted C1 to C10 aliphatic group, a substituted or unsubstituted C6 to C20 aromatic group, an alkoxy group of formula —$OR^{200}$, wherein $R^{200}$ is a C1 to C10 aliphatic organic group, or a silyl group of formula —$SiR^{201}R^{202}R^{203}$, wherein $R^{201}$, $R^{202}$, and $R^{203}$ are the same or different and are each independently a hydrogen or a C1 to C10 aliphatic organic group, and n1 and n2 are the same or different and are independently an integer ranging from 0 to 4,

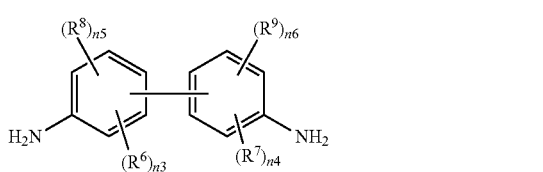

Chemical Formula 3-1 wherein, in Chemical Formula 3-1, $R^6$ and $R^7$ are the same or different and are each independently an electron withdrawing group, $R^8$ and $R^9$ are the same or different and are each independently a halogen, a hydroxy group, a substituted or unsubstituted C1 to C10 aliphatic organic group, a substituted or unsubstituted C6 to C20 aromatic organic group, an alkoxy group of formula —$OR^{264}$, wherein $R^{204}$ is a C1 to C10 aliphatic organic group, or a silyl group of formula —$SiR^{205}R^{206}R^{207}$, wherein $R^{205}$, $R^{206}$, and $R^{207}$ are the same or different, and are each independently a hydrogen, or a C1 to C10 aliphatic organic group, n3 is an integer ranging from 1 to 4, n5 is an integer ranging from 0 to 3, provided that n3+n5 is an integer ranging from 1 to 4, and n4 is an integer ranging from 1 to 4, n6 is an integer ranging from 0 to 3, provided that n4+n6 is an integer ranging from 1 to 4,

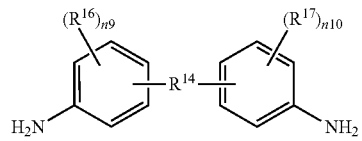

Chemical Formula 4-1 wherein, in Chemical Formula 4-1, $R^{14}$ is —O—, —S—, —C(=O)—, —CH(OH)—, —S(=O)$_2$—, —Si(CH$_3$)$_2$—, —(CH$_2$)$_p$—, wherein 1≤p≤10, —(CF$_2$)$_q$—, wherein 1≤q≤10, —C(CH$_3$)$_2$—, —C(CF$_3$)$_2$—, and —C(=O)NH—, or a substituted or unsubstituted C6 to C30 aromatic organic group, wherein the aromatic organic group is one aromatic ring, two or more aromatic rings fused together to provide a condensed ring system, or two or more moieties linked through a single bond or through a functional group selected from a fluorenylene group, —O—, —S—, —C(=O)—, —CH(OH)—, —S(=O)$_2$—, —Si(CH$_3$)$_2$—, —(CH$_2$)$_p$—, wherein 1≤p≤10, —(CF$_2$)$_q$—, wherein 1≤q≤10, —C(CH$_3$)$_2$—, —C(CF$_3$)$_2$—, and —C(=O)NH—, $R^{16}$ and $R^{17}$ are the same or different, and are each independently a halogen, a hydroxy group, a substituted or unsubstituted C1 to C10 aliphatic organic group, a substituted or unsubstituted C6 to C20 aromatic organic group, an alkoxy group of formula —$OR^{212}$, wherein $R^{212}$ is a C1 to C10 aliphatic organic group, or a silyl group of formula —$SiR^{213}R^{214}R^{215}$, wherein $R^{213}$, $R^{214}$, and $R^{215}$ are the same or different, and are each independently a hydrogen or a C1 to C10 aliphatic organic group, and n9 and n10 are each independently an integer ranging from 0 to 4.

4. The composition of preparing a poly(imide-amide) copolymer according to claim 3, wherein $R^a$ in Chemical Formula 2 and Chemical Formula 2-1 is independently selected from chemical formulae:

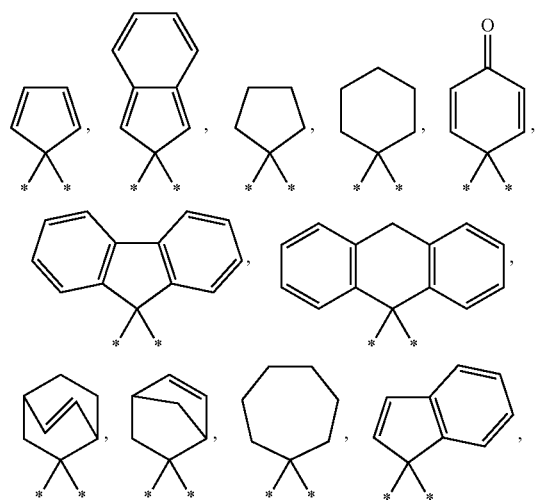

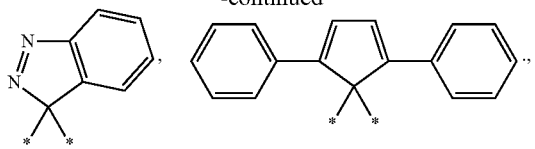

$R^6$ and $R^7$ in Chemical Formula 3 and Chemical Formula 3-1 are the same or different, and are each independently selected from —$CF_3$, —$CCl_3$, —$CBr_3$, —$Cl_3$, —$NO_2$, —CN, —C(=O)$CH_3$, and —$CO_2C_2H_5$, and $R^{14}$ in Chemical Formula 4 and Chemical Formula 4-1 is $SO_2$, and both n9 and n10 in Chemical Formula 4 and Chemical Formula 4-1 are the integer of 0.

5. The composition of preparing a poly(imide-amide) copolymer according to claim 4, wherein the reaction products of a diamine and a dianhydride are the reaction products of a reaction among a diamine represented by Chemical Formula 1, a diamine represented by Chemical Formula 3-1, and a dianhydride represented by Chemical Formula 6, Chemical Formula 7, or a combination thereof, wherein in Chemical Formula 1, both n1 and n2 are 0, and both $Ar_1$ and $Ar_2$ are represented by Chemical Formula 3, wherein in Chemical Formula 3, both R6 and R7 are —$CF_3$, both n3 and n4 are 1, and both n5 and n6 are 0, wherein in Chemical Formula 3-1, both R6 and R7 are —$CF_3$, both n3 and n4 are 1, and both n5 and n6 are 0, and wherein in Chemical Formula 6, Chemical Formula 7, or a combination thereof, both n7 and n8 are 0.

6. An article comprising a poly(imide-amide) copolymer prepared by a method comprising reacting a diamine comprising a diamine represented by Chemical Formula 1 with a dianhydride comprising a dianhydride represented by Chemical Formula 5 to separately prepare a poly(imide-amide) oligomer comprising an amino group at both ends thereof and a poly(imide-amide) oligomer comprising an anhydride group at both ends thereof, mixing the separately prepared poly(imide-amide) oligomer comprising an amino group at both ends thereof and a poly(imide-amide) oligomer comprising an anhydride group at both ends thereof to provide a mixture, and curing the mixture:

Chemical Formula 1

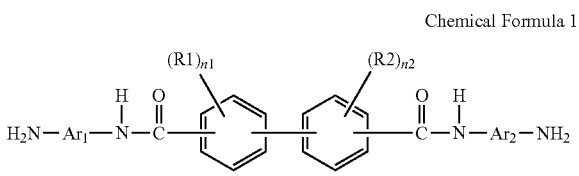

wherein, in Chemical Formula 1,

R1 and R2 are the same or different, and are each independently selected from a halogen, a hydroxyl group, a substituted or unsubstituted C1 to C10 alkyl group, a substituted or unsubstituted C6 to C20 aryl group, or a substituted or unsubstituted C1 to C10 alkoxy group, n1 and n2 are the same or different, and are each independently an integer from 0 to 4, $Ar_1$ and $Ar_2$ are the same or different and are each independently represented by Chemical Formula 2, Chemical Formula 3, or Chemical Formula 4:

Chemical Formula 2

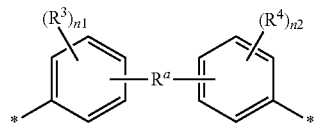

wherein, in Chemical Formula 2, $R^a$ is a substituted or unsubstituted C3 to C30 alicyclic organic group, a substituted or unsubstituted C6 to C30 aromatic organic group, or a substituted or unsubstituted C2 to C30 heterocyclic group, $R^3$ and $R^4$ are the same or different and are each independently a halogen, a hydroxyl group, a substituted or unsubstituted C1 to C10 aliphatic group, a substituted or unsubstituted C6 to C20 aromatic group, an alkoxy group of formula —$OR^{200}$, wherein $R^{200}$ is a C1 to C10 aliphatic organic group, or a silyl group of formula —$SiR^{201}R^{202}R^{203}$, wherein $R^{201}$, $R^{202}$, and $R^{203}$ are the same or different and are each independently a hydrogen or a C1 to C10 aliphatic organic group, and n1 and n2 are the same or different and are each independently an integer ranging from 0 to 4, Chemical Formula 3

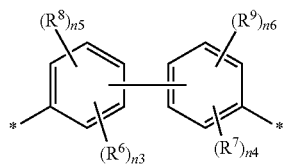

wherein, in Chemical Formula 3, $R^6$ and $R^7$ are the same or different and are each independently an electron withdrawing group, $R^8$ and $R^9$ are the same or different, and are each independently a halogen, a hydroxy group, a substituted or unsubstituted C1 to C10 aliphatic organic group, a substituted or unsubstituted C6 to C20 aromatic organic group, an alkoxy group of formula —$OR^{204}$, wherein $R^{204}$ is a C1 to C10 aliphatic organic group, or a silyl group of formula —$SiR^{205}R^{206}R^{207}$, wherein $R^{205}$, $R^{206}$, and $R^{207}$ are the same or different, and are each independently a hydrogen or a C1 to C10 aliphatic organic group, n3 is an integer ranging from 1 to 4,
n5 is an integer ranging from 0 to 3,
provided that n3+n5 is an integer ranging from 1 to 4,
n4 is an integer ranging from 1 to 4,
n6 is an integer ranging from 0 to 3,
provided that n4+n6 is an integer ranging from 1 to 4, Chemical Formula 4

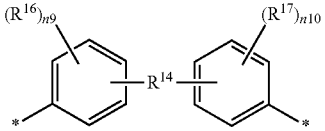

wherein, in Chemical Formula 4, $R^{14}$ is —O—, —S—, —C(=O)—, —CH(OH)—, —S(=O)$_2$—, —Si($CH_3$)$_2$—, —($CH_2$)$_p$—, wherein 1≤p≤10, —($CF_2$)$_q$—, wherein 1≤q≤10, —C($CH_3$)$_2$—, —C($CF_3$)$_2$—, and —C(=O)NH—, or a substituted or unsubstituted C6 to C30 aromatic organic group, wherein the aromatic organic group is one aromatic ring, two or more aromatic rings fused together to provide a condensed ring system, or two or more moieties linked through a single bond or through a functional group selected from a fluorenylene group, —O—, —S—, —C(=O)—, —CH(OH)—, —S(=O)$_2$—, —Si(CH$_3$)$_2$—, —(CH$_2$)$_p$—, wherein 1≤p≤10, —(CF$_2$)$_q$—, wherein 1≤q≤10, —C(CH$_3$)$_2$—, —C(CF$_3$)$_2$—, and —C(=O)NH—, $R^{16}$ and $R^{17}$ are the same or different, and are each independently a halogen, a hydroxy group, a substituted or unsubstituted C1 to C10 aliphatic organic group, a substituted or unsubstituted C6 to C20 aromatic organic group, an alkoxy group of formula —OR$^{212}$, wherein R$^{212}$ is a C1 to C10 aliphatic organic group, or a silyl group of formula —SiR$^{213}$R$^{214}$R$^{215}$, wherein R$^{213}$, R$^{214}$, and R$^{215}$ are the same or different, and are each independently a hydrogen or a C1 to C10 aliphatic organic group, and n9 and n10 are each independently an integer ranging from 0 to 4, and Chemical Formula 5

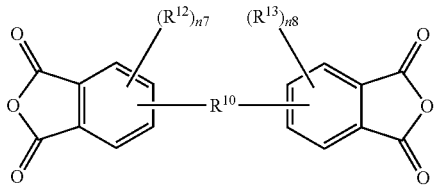

wherein, in Chemical Formula 5, $R^{10}$ is a substituted or unsubstituted C1 to C30 aliphatic group, a substituted or unsubstituted C3 to C30 alicyclic organic group, a substituted or unsubstituted C6 to C30 aromatic organic group, or a substituted or unsubstituted C2 to C30 heterocyclic group, $R^{12}$ and $R^{13}$ are the same or different and are each independently a halogen, a hydroxyl group, a substituted or unsubstituted C1 to C10 aliphatic group, a substituted or unsubstituted C6 to C20 aromatic group, an alkoxy group of formula —OR$^{205}$, wherein R$^{205}$ is a C1 to C10 aliphatic organic group, or a silyl group of formula —SiR$^{209}$R$^{210}$R$^{211}$, wherein R$^{209}$, R$^{210}$, and R$^{211}$ are the same or different and are each independently a hydrogen, or a C1 to C10 aliphatic organic group, and n7 and n8 are the same or different and are each independently an integer ranging from 0 to 3.

7. A display device comprising the article according to claim 6.

8. The composition of preparing a poly(imide-amide) copolymer according to claim 1, wherein the second poly (imide-amide) oligomer comprising an anhydride group at both ends thereof has a larger weight average molecular weight than the first poly(imide-amide) oligomer comprising an amino group at both ends thereof.

9. The composition of preparing a poly(imide-amide) copolymer according to claim 8, wherein the ratio of the weight average molecular weight of the first poly(imide-amide) oligomer comprising an amino group at both ends thereof to the weight average molecular weight of the second poly(imide-amide) oligomer comprising an anhydride group at both ends thereof is about 0.7 to about 0.95.

\* \* \* \* \*